(12) United States Patent
Khodaei et al.

(10) Patent No.: US 12,494,641 B2
(45) Date of Patent: Dec. 9, 2025

(54) METHODS AND SYSTEMS FOR DETERMINING DISTRIBUTION GRID HOSTING CAPACITY

(71) Applicants: Commonwealth Edison Company, Chicago, IL (US); University of Denver, Denver, CO (US)

(72) Inventors: Amin Khodaei, Denver, CO (US); Shay Bahramirad, Oakbrook Terrace, IL (US); Aleksi Paaso, Chicago, IL (US)

(73) Assignees: Commonwealth Edison Company, Chicago, IL (US); University of Denver, Denver, CO (US)

( * ) Notice: Subject to any disclaimer, the term of this patent is extended or adjusted under 35 U.S.C. 154(b) by 0 days.

(21) Appl. No.: 18/653,167

(22) Filed: May 2, 2024

(65) Prior Publication Data

US 2024/0364108 A1 Oct. 31, 2024

Related U.S. Application Data

(63) Continuation of application No. 16/410,782, filed on May 13, 2019, now Pat. No. 12,003,102.

(Continued)

(51) Int. Cl.
*H02J 3/00* (2006.01)
*H02J 3/38* (2006.01)
(Continued)

(52) U.S. Cl.
CPC .............. *H02J 3/003* (2020.01); *H02J 3/007* (2020.01); *H02J 3/381* (2013.01); *H02J 3/48* (2013.01);
(Continued)

(58) Field of Classification Search
CPC .. H02J 3/003; H02J 3/007; H02J 3/381; H02J 3/48; H02J 3/50; H02J 2203/20; H02J 2300/24; H02J 2300/28; H02J 13/00002; H02J 3/00; H02J 3/06; H02J 3/242; H02J 13/00001; H02J 13/00006; H02J 13/00016; H02J 13/00017; H02J 13/00022; H02J 2203/10; H02J 3/001; H02J 3/0012; H02J 3/002; H02J 3/241; H02J 3/38; Y02E 60/00; Y02E 10/56; Y02E 10/76; Y04S 10/50; Y04S 40/20; Y04S 10/22; Y04S 10/30;
(Continued)

(56) References Cited

U.S. PATENT DOCUMENTS

| | | | |
|---|---|---|---|
| 2017/0003702 A1* | 1/2017 | Ditlow | G06Q 50/06 |
| 2019/0288514 A1* | 9/2019 | Shukla | H02J 3/38 |
| 2021/0396790 A1* | 12/2021 | Sakschewski | G01R 31/62 |

* cited by examiner

*Primary Examiner* — Elim Ortiz
(74) *Attorney, Agent, or Firm* — Ballard Spahr LLP

(57) ABSTRACT

Methods and systems for determining a hosting capacity in a distribution grid are disclosed herein. The methods and systems may use optimization models that consider operating conditions of a distribution grid having a distinct topology, characteristics, and predetermined performance parameters. The determination of a hosting capacity may first consider a lossless power flow model for the distribution grid, which may then be used to arrive at a maximum hosting capacity for the distribution grid. The maximum hosting capacity may be defined as the total capacity of a number of distributed generators connected to the distribution grid such that the performance parameters will be met.

20 Claims, 16 Drawing Sheets

Related U.S. Application Data

(60) Provisional application No. 62/674,403, filed on May 21, 2018.

(51) Int. Cl.
 *H02J 3/48* (2006.01)
 *H02J 3/50* (2006.01)

(52) U.S. Cl.
 CPC ............. *H02J 3/50* (2013.01); *H02J 2203/20* (2020.01); *H02J 2300/24* (2020.01); *H02J 2300/28* (2020.01)

(58) Field of Classification Search
 CPC .......... Y04S 10/20; Y04S 10/40; Y04S 10/52; Y04S 20/222; Y04S 40/12
 USPC ..... 700/2, 295, 286, 60, 291, 297, 287, 292; 290/44
 See application file for complete search history.

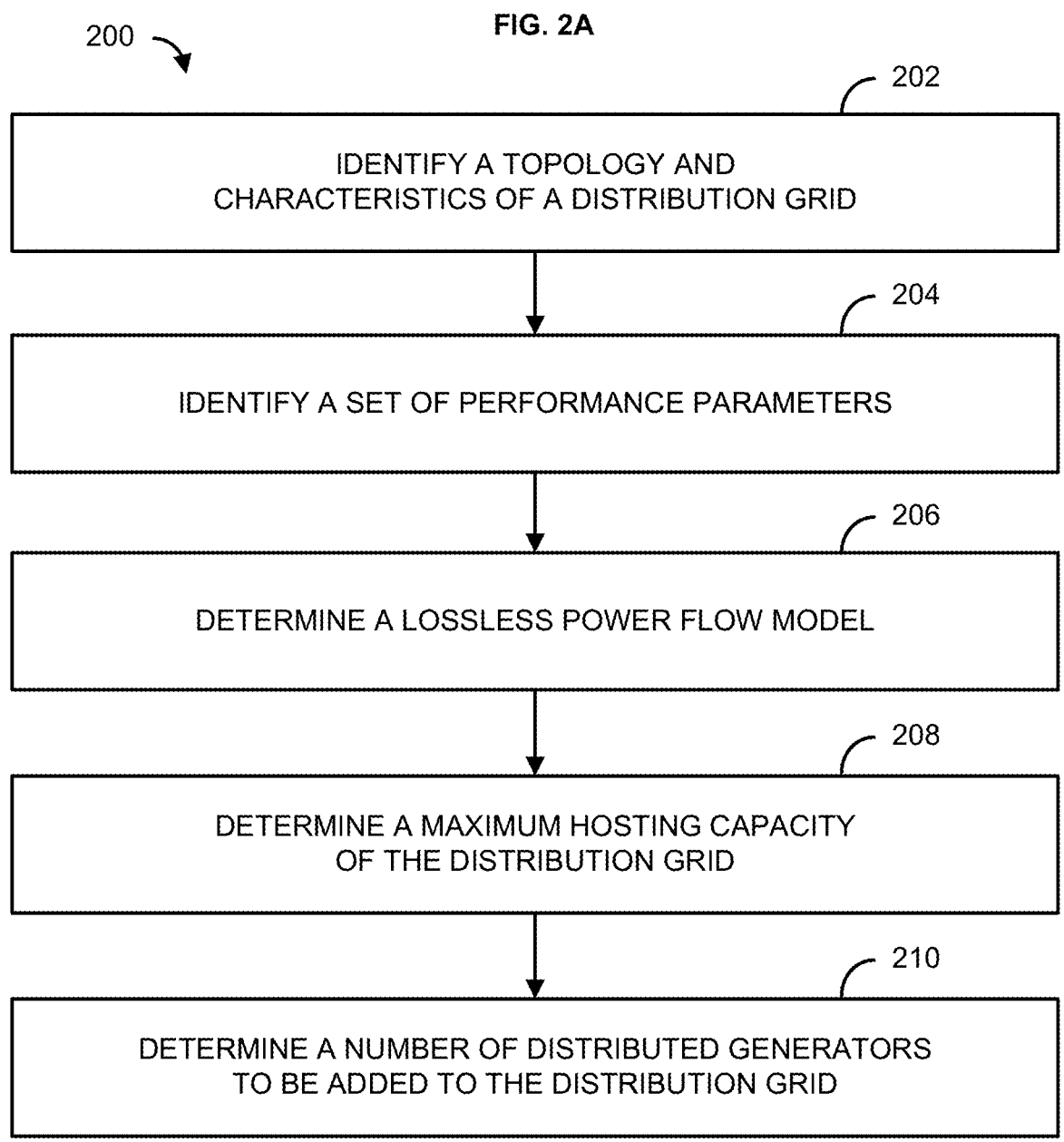

FIG. 6

| Bus # | Scenario 1 | Scenario 2 | Scenario 3 |
|---|---|---|---|
| 2 | 7624 | 8484 | 0 |
| 16 | 0 | 0 | 0 |
| 18 | 0 | 0 | 190 |
| 19 | 90 | 0 | 0 |
| 20 | 770 | 0 | 0 |
| 21 | 0 | 0 | 0 |
| 22 | 0 | 0 | 200 |
| 25 | 0 | 0 | 920 |
| 32 | 0 | 0 | 0 |
| 33 | 0 | 0 | 160 |
| Total DG (kW) | 8484 | 8484 | 1470 |
| Total loss (kW) | 175.12 | 175.15 | 114.43 |

Base load hosting capacity results (kW)

FIG. 7

| Bus # | Scenario 1 | Scenario 2 | Scenario 3 |
|---|---|---|---|
| 2 | 5471 | 6116 | 0 |
| 16 | 0 | 0 | 0 |
| 18 | 0 | 0 | 136 |
| 19 | 37 | 0 | 0 |
| 20 | 608 | 0 | 0 |
| 22 | 0 | 0 | 146 |
| 25 | 0 | 0 | 668 |
| 32 | 0 | 0 | 0 |
| 33 | 0 | 0 | 124 |
| Total DG (kW) | 6116 | 6116 | 1074 |
| Total loss (kW) | 35.12 | 34.1 | 12.87 |

Uncertain load hosting capacity results (kW)

Hosting capacity results based on the change in capacity limits of lines 1 and 2

| Bus # | Base load hosting capacity | | Uncertain load hosting capacity | |
|---|---|---|---|---|
| | ±0.1 p.u voltage deviation limit | ±0.05 p.u voltage deviation limit | ±0.1 p.u voltage deviation limit | ±0.05 p.u voltage deviation limit |
| 2 | 7624 | 7541 | 5471 | 6116 |
| 15 | 0 | 71 | 0 | 0 |
| 16 | 0 | 38 | 0 | 0 |
| 17 | 0 | 108 | 37 | 0 |
| 18 | 0 | 121 | 608 | 0 |
| 19 | 90 | 0 | 0 | 0 |
| 20 | 770 | 0 | 0 | 0 |
| 32 | 0 | 481 | 0 | 0 |
| 33 | 0 | 40 | 0 | 0 |
| Total DG (kW) | 8484 | 8400 | 6116 | 6116 |
| Total loss (kW) | 175.12 | 93.5 | 35.12 | 34.09 |

FIG. 12

Grid hosting capacity results (kW) based on the change in voltage deviation limits Voltage magnitudes based on hosting capacity results under base load conditions Hosting capacity for each individual bus (accuracy comparison).

METHODS AND SYSTEMS FOR DETERMINING DISTRIBUTION GRID HOSTING CAPACITY

CROSS REFERENCE TO RELATED PATENT APPLICATION

This application is a continuation of U.S. patent application Ser. No. 16/410,782, filed on May 13, 2019, which claims priority to U.S. Provisional Application No. 62/674,403, filed on May 21, 2018, all of which are herein incorporated by reference in their entirety.

BACKGROUND

Distributed Generators are small units of power generation that are directly connected to a distribution grid and are in close proximity to utility customers. There is a growing proliferation of distributed generators in distribution grids, due to the falling cost of the technology as well as promising benefits for end-use customers, such as payment reduction and potential improvement in grid reliability at load points. Those who use distributed generators, unlike most utility customers, have the ability to produce electricity and, in some circumstances, sell surplus energy back to the utility company. Among available distributed generator technologies, solar photovoltaic ("PV") and small-scale wind turbines are projected to be the most widely adopted platforms.

By the end of 2016, the total capacity of all grid-connected solar PV installations in the United States reached 36 gigawatts, rising well above the 25.6 gigawatts of total capacity in 2015 and 18.3 gigawatts in 2014. While the growing use of distributed generators creates interesting options for end-use customers and brings new solutions for system operators seeking to shift power generation from large-scale plants to small-scale distributed resources, it also presents new risks to distribution grid users and operators. These and other shortcomings are addressed by the methods and systems described herein.

SUMMARY

It is to be understood that both the following general description and the following detailed description are exemplary and explanatory only and are not restrictive. Methods and systems are described herein for determining a distribution grid's hosting capacity. A topology, one or more characteristics, and/or a set of performance parameters can be determined for, among other distribution grid designs, a radial distribution grid. A lossless power flow model can be determined for the radial distribution grid based on the topology, the one or more characteristics, and/or the set of performance parameters. Based on the lossless power flow model, a maximum hosting capacity can be determined, which in turn can be used to determine a number of distributed generators that the radial distribution grid can accommodate without sacrificing performance parameters. Additionally, knowing the hosting capacity of the radial distribution grid can shed light on the roles and impacts of distributed generators installed on the radial distribution grid. For example, determining the hosting capacity can give infrastructure developers insight into where additional distributed generators can be installed. It can also help to determine where upgrades to the radial distribution grid may be needed in order to accommodate a forecasted growth of distributed generator use.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 2A shows a flowchart illustrating an exemplary method;

FIG. 6 shows a table showing values of hosting capacity for distribution buses of an exemplary radial distribution grid at a base electrical load;

FIG. 7 shows a table showing values of hosting capacity for distribution buses of an exemplary radial distribution grid at uncertain electrical loads;

FIG. 12 shows a table showing changes of hosting capacity for an exemplary radial distribution grid based on changes in voltage magnitude deviations for several distribution buses of the radial distribution grid;

DETAILED DESCRIPTION

Figure 1:
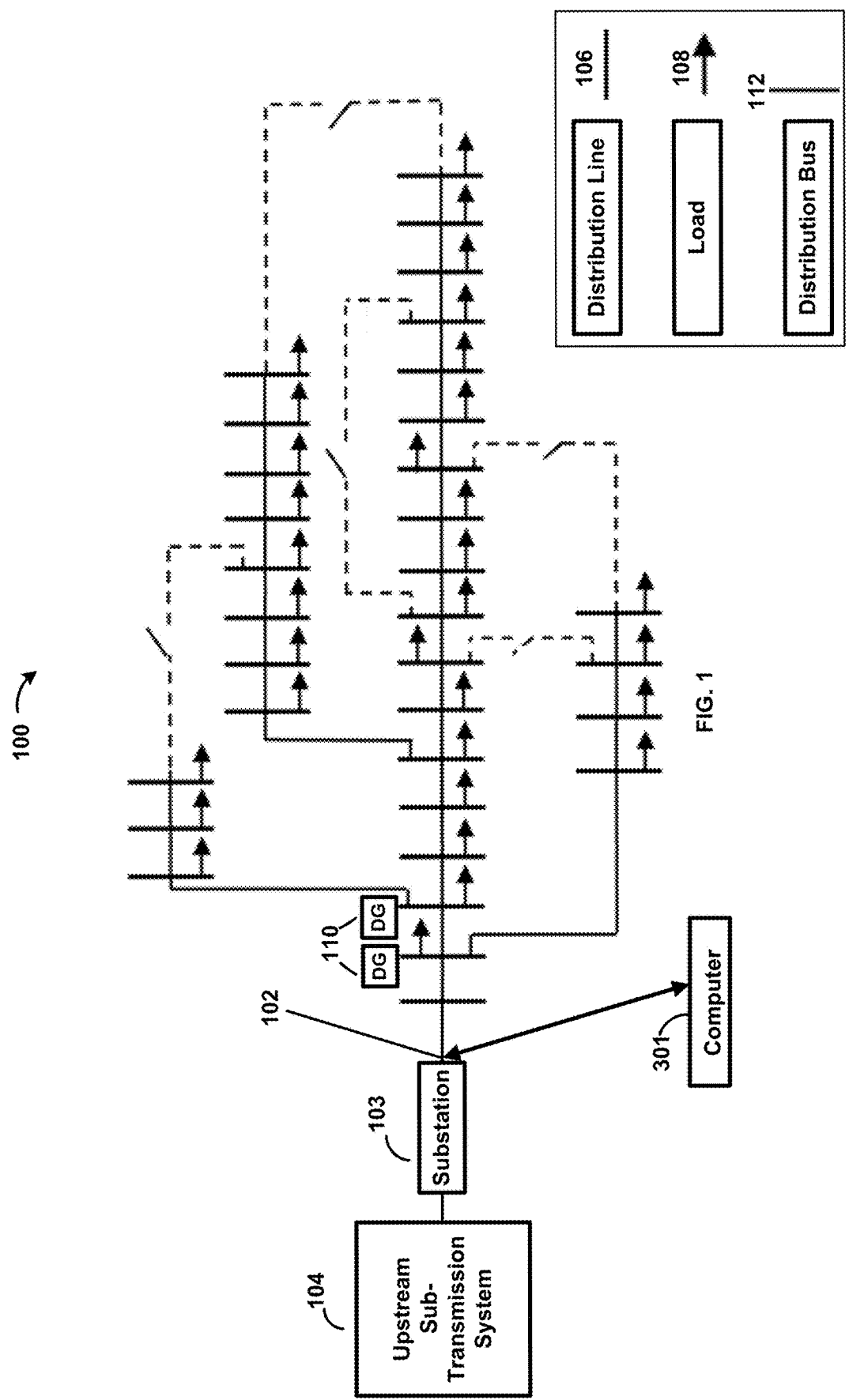
FIG. 1 shows an exemplary radial distribution grid.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods. The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The methods and systems disclosed by the present application can be used to, among other things, determine a hosting capacity for a distribution grid while maintaining specific, predetermined performance parameters. Ascertaining a distribution grid's hosting capacity has become increasingly important as the use of distributed generators has been rising, thereby creating new opportunities as well as new risks. Most notably, rapid growth of distributed generator installations on a given distribution grid can put it at a higher risk of inefficient and/or low-reliability supply due to operational quantities potentially peaking and resulting in power quality or reliability concerns at the system and customer levels. To ameliorate the risks, a variety of factors, such as rises/drops in voltage magnitudes at distribution buses and power flows in distribution lines, can be considered when installing distributed generators on a distribution grid. In order to determine the maximum amount of distributed generators a given distribution grid can accommodate, a distribution grid's "hosting capacity" can be determined. Hosting capacity can be defined as the amount of additional production or consumption of power that a distribution grid's infrastructure can withstand without adversely impacting the reliability or voltage quality for customers not using distributed generators. Operational performance can be measured using various factors, including, for example, voltage magnitudes, feeder power flows, power quality, and/or the like. Protection can also be considered as a performance measure, because, in some cases, distributed generators on a distribution grid may provide more power to the distribution grid than currently demanded by downstream customers, which can cause a reverse power flow in distribution feeders.

Hosting capacity studies known in the art can be categorized into two main groups: (i) studies that propose hosting capacity calculation methods based on a variety of grid performance measures and system characteristics, and (ii) studies that focus on grid upgrades or operational practices to increase hosting capacity. Other studies further investigate the impact of distributed generators on selected operational performance measures, including, among other things, distribution bus overvoltage, distribution line overload, and/ or power quality. These existing methods rely on an iterative approach when calculating hosting capacity (e.g., an initial value for distributed generator capacity at a given distribution bus in a distribution grid is considered and then incrementally increased up to a point where a desired performance measure leaves a region of acceptability).

The iterative approach has major drawbacks. One major drawback is that spatial interdependency of distributed generator installations is ignored, because the iterative approach does not provide the ability to study and analyze the impact of distributed generator installations in one distribution bus relative to other distribution buses in a distribution grid. The iterative approach also cannot properly analyze the impact of simultaneous distributed generator installations in several distribution buses on overall hosting capacity. This shortcoming can prevent finding an optimal, or even a near-optimal, hosting capacity. Another major drawback is that the iterative approach is time-consuming, because each iteration requires solving a complete power flow calculation. In some cases, this means thousands of iterations are required in order to find a distribution grid's hosting capacity—making the approach much less useful when considering large distribution grids.

The methods and systems described herein seek to overcome these and other shortcomings by determining a hosting capacity using an optimization approach that considers, among other things, distribution bus overvoltage and/or distribution line overload. This approach can effectively consider spatial interdependencies while simultaneously avoiding a time-consuming iterative approach. For example, in a comparative study, the present methods and systems greatly outperformed the traditional, iterative approach while maintaining accuracy with a statistically insignificant percent error. This is due to, among other things, the fact the iterative approach is restricted by computational requirements. To demonstrate this restriction, the resolution of the hosting capacity was increased in the comparative study and the computational runtime of both approaches was measured. Hosting capacity resolution can be increased in the iterative approach by reducing the distributed generator step size during each iteration. With reduced step size, more values of distributed generator power injection are sampled in a given range at the cost of requiring more iterations. The comparative study considered four distributed generator step sizes: 1 kW, 10 kW, 100 kW, and 1 MW. To avoid impractical computation times, distributed generator power generation was only swept in one location (e.g., at one distribution bus) at a time.

Results of the comparative study indicated that a trade-off emerges using the iterative approach in which decreasing the error in the hosting capacity calculation causes an increase in computation time, while decreasing computation time causes an increase in error. For distributed generator step sizes of 1 kW, 10 kW, 100 kW and 1 MW, the computation time for the iterative approach was 472 seconds, 49 seconds, 6 seconds, and 2 seconds, respectively. While it is feasible to find a balance between accuracy and time when only one distribution bus is being considered, it becomes infeasible to do so when considering distributed generator placement at multiple distribution buses simultaneously. The same analysis was then performed on the same system using the methods and systems of the present application, and the results indicated a minimal 0.32% of error. The difference in total hosting capacity between the two approaches was likewise minimal: 8.518 MW for the iterative approach and 8.484 MW using the present methods and systems—a difference of only 0.41%.

Further, the present methods and systems vastly outperformed the iterative approach with regard to computational runtime. When analyzing the hosting capacity of each distribution bus individually, average runtimes for the iterative approach were approximately 472 seconds, while the runtimes for the present methods and systems averaged approximately 1.2 seconds. When considering all distribution buses simultaneously, the iterative approach had a total runtime of approximately 1,032 hours. This lengthy runtime is a result of the iterative approach's requirement to compute all permutations of distributed generator power injections at all distribution buses when determining the optimal hosting capacity. The present methods and systems reproduced the same result in approximately 4 seconds, and the accuracy in obtaining voltage magnitudes between the iterative approach and the present methods and systems differed by less than 0.07% for all distribution buses. The results of the comparative study exemplify the improvement in computational speed using the present methods and systems versus the traditional, iterative approach. The present methods and systems do not suffer from the speed-to-accuracy tradeoff inherent in the iterative approach. Moreover, the improvement the present methods and systems provide is realized without sacrificing accuracy in any statistically significant way.

Turning now to FIG. 1, an example radial distribution grid 100 on which the methods and systems described herein may be employed is depicted. The radial distribution grid 100 can be arranged in a tree-type configuration with a substation 103 at the top of the tree providing electrical power through one or more distribution lines 106 connected to one more one distribution buses 112, each of which having a given electrical load 108. The one or more distribution lines 106 can be connected to any number of the one or more distribution buses 112 using a variety of suitable configurations known in the art. The one or more distribution buses 112 can have a range of designs, including, for example, being housed within switchgear, panel boards, and/or busway enclosures—all of which being capable of withstanding a variety of electrical loads 108. The one or more distribution buses 112 may be connected to high voltage equipment at electrical switchyards, low voltage equipment in battery banks, residential transformers, or the like. The radial distribution grid 100 can also comprise one or more distributed generators 110, each of which being capable of receiving as well as providing electrical power through distribution lines 106. The one or more distributed generators 110 can be one or more solar photovoltaic ("PV") devices, one or more wind turbines, or the like, located at commercial locations and/or residential locations.

The substation 103 can be connected by distribution lines 106 to an upstream sub-transmission system 104, and connected by distribution lines 106 at a point of interest 102 to radial distribution grid 100. The upstream sub-transmission system 104 can receive excess electrical power from the radial distribution grid 100 via distribution lines 106. In some embodiments, the excess electrical power is provided to the radial distribution grid 100 by one or more distributed generators 110. In these embodiments, when determining a hosting capacity for a given radial distribution grid 100 using the methods and systems described herein, the upstream sub-transmission system 104 can be considered as an infinite distribution bus 112 with a constant voltage magnitude. The point of interest 102 can be at any of the one more distribution buses 112. For example, the distribution bus 112 that is closest to the upstream sub-transmission system 104 could be the point of interest 102. In such an example, there are no distributed generators 110 at the point of interest 102. It is to be understood that the distribution grid layouts described herein are for illustrative purposes only. Additional distribution grid layouts are contemplated.

Figure 2B:
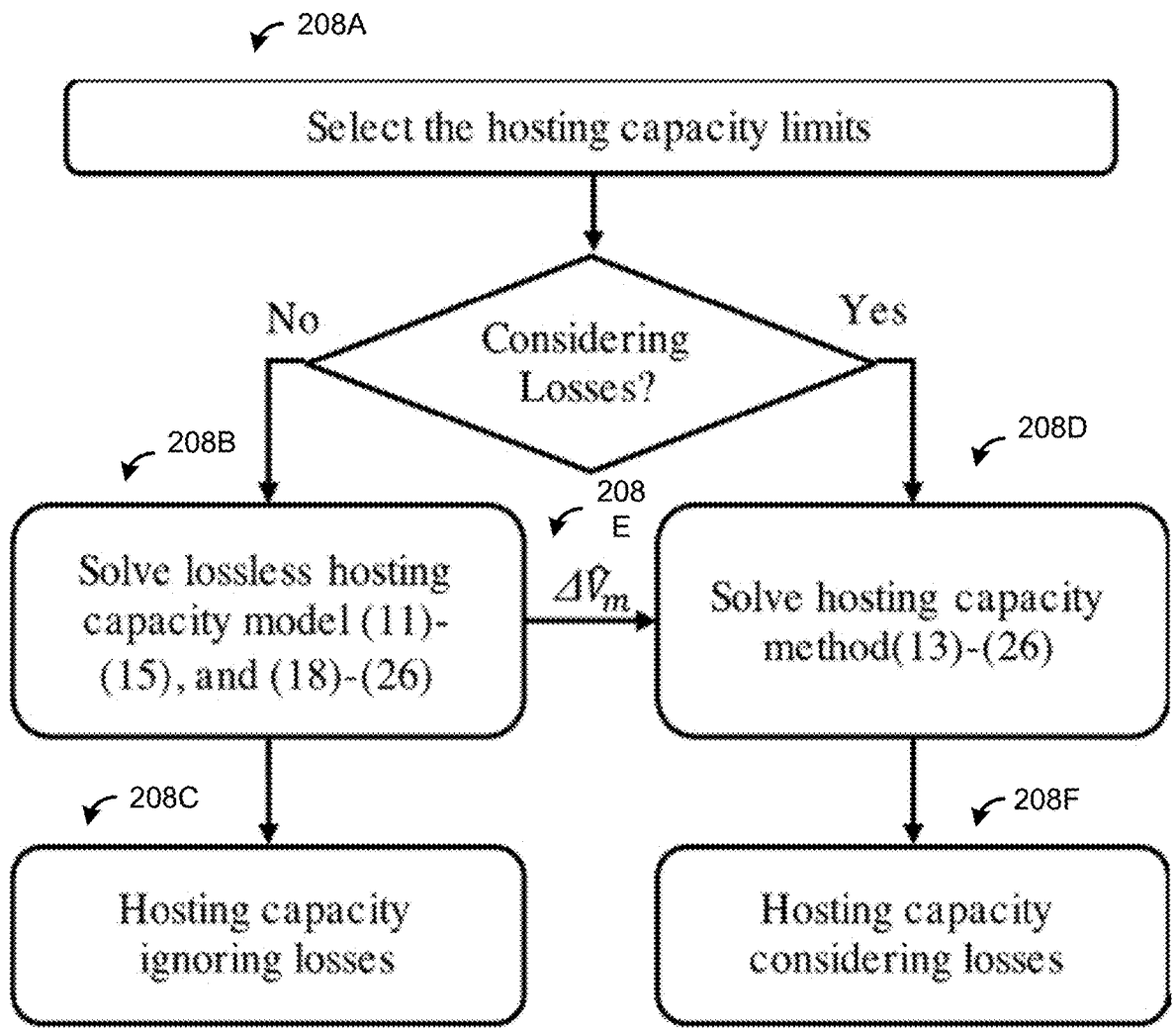
FIG. 2B shows a flowchart illustrating an exemplary method.

Turning now to FIGS. 2A and 2B, flowcharts of an example method 200 for determining a hosting capacity are shown. In some aspects, the method 200 can be used to address shortcomings known in the art by using an optimization-based approach when determining hosting capacity. This approach can determine a maximum distributed generator 110 hosting capacity for radial distribution grid 100 without negatively impacting performance. Two example performance measures—distribution bus 112 overvoltage and distribution line 106 overload—may be used for this purpose. Unlike methods known in the art, the method 200 disclosed herein can effectively consider spatial interdependencies and also determine solutions in one instance instead of using many iterations. The method 200 uses a linear model for power flow analysis and formulates the approach based on linear programming. This can allow for dynamic changes to be made to the model in order to account for newly installed distributed generators 110 and to update a hosting capacity determination.

Figure 3:
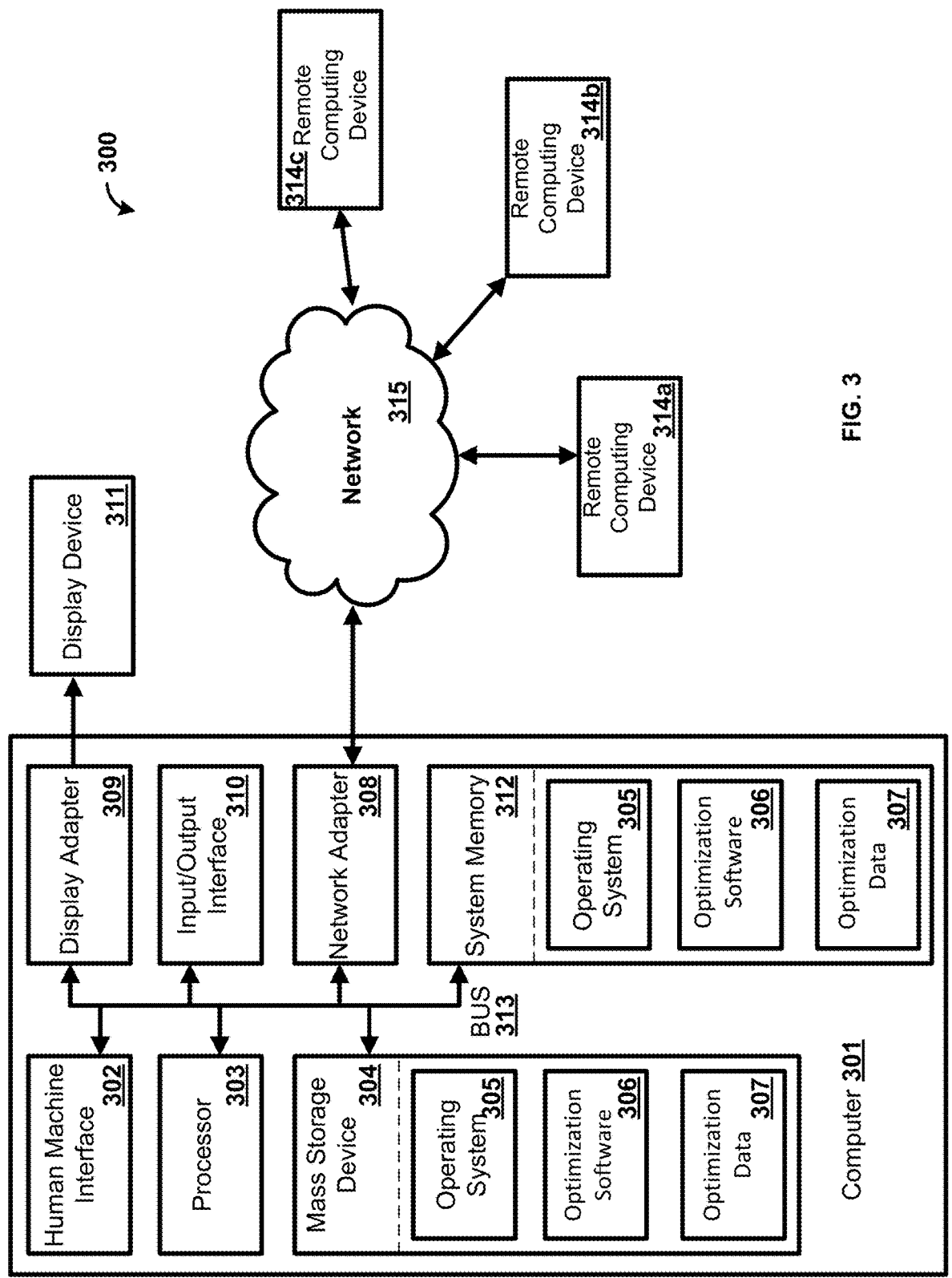
FIG. 3 shows a block diagram of an exemplary computing device.

In an exemplary embodiment, the methods and systems can be implemented on a computer 301 as illustrated in FIG. 3 and described below. Similarly, the methods and systems disclosed can utilize one or more computers to perform one or more functions in one or more locations. FIG. 3 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment. The methods and systems of the described herein make it possible to determine the hosting capacity for radial distribution grid 100 quickly, efficiently, and with access to active and reactive power flow information. Moreover, the methods and systems can consider all electrical load 108 variations at the one or more distribution buses 112 of radial distribution grid 100.

In an exemplary embodiment, the method 200 can be implemented on a computer 301 connected to radial distribution grid 100 at the point of interest 102. Computer 301 can be operational with numerous general purpose or special purpose computing system environments or configurations. Examples of well-known computing systems, environments, and/or configurations that can be suitable for use with computer 301 comprise, but are not limited to, personal computers, server computers, laptop devices, and/or multi-processor systems. Additional examples comprise network PCs, minicomputers, mainframe computers, distributed computing environments that comprise any of the above systems or devices, and the like.

Computer 301 can use software components, including, for example, IBM's CPLEX®, when implementing the disclosed methods and systems. Further, the disclosed methods and systems can be described in the general context of computer-executable instructions, such as program modules, being executed by one or more computers or other devices. Generally, program modules comprise computer code, routines, programs, objects, components, data structures, etc., that perform particular tasks or implement particular abstract data types. The disclosed methods and systems can also be practiced in distributed computing environments where tasks are performed by remote processing devices that are linked through a communications network. In a distributed computing environment, program modules can be located in both local and remote computer storage media including memory storage devices.

The components of the computer 301 can comprise, but are not limited to, one or more processors 303, a system memory 312, and a system bus 313 that couples various system components including the one or more processors 303 to the system memory 312. The system can utilize parallel computing. The system distribution bus 313 represents one or more of several possible types of bus structures, including a memory bus or memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Distribution bus (USB) and the like. The bus 313, and all buses specified in this description can also be implemented over a wired or wireless network connection and each of the subsystems, including the one or more processors 303, a mass storage device 304, an operating system 305, hosting optimization software 306, hosting optimization data 307, a network adapter 308, the system memory 312, an Input/Output Interface 310, a display adapter 309, a display device 311, and a human machine interface 302, can be contained within one or more remote computing devices 314a,b,c at physically separate locations, connected through distribution buses 112 of this form, in effect implementing a fully distributed system.

The computer 301 typically comprises a variety of computer readable media. Exemplary readable media can be any available media that is accessible by the computer 301 and comprises, for example and not meant to be limiting, both volatile and non-volatile media, removable and non-removable media. The system memory 312 comprises computer readable media in the form of volatile memory, such as random access memory (RAM), and/or non-volatile memory, such as read only memory (ROM). The system memory 312 typically contains data such as the hosting optimization data 307 and/or program modules such as the operating system 305 and the hosting optimization 306 that are immediately accessible to and/or are presently operated on by the one or more processors 303.

In another aspect, the computer 301 can also comprise other removable/non-removable, volatile/non-volatile computer storage media. By way of example, FIG. 3 illustrates the mass storage device 304 which can provide non-volatile storage of computer code, computer readable instructions, data structures, program modules, and other data for the computer 301. For example and not meant to be limiting, the mass storage device 304 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 304, including by way of example, the operating system 305 and the hosting optimization software 306. Each of the operating system 305 and the hosting optimization software 306 (or some combination thereof) can comprise elements of the programming and the hosting optimization software 306. The hosting optimization data 307 can also be stored on the mass storage device 304. The hosting optimization data 307 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 301 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 303 via the human machine interface 302 that is coupled to the system distribution bus 313, but can be connected by other interface and distribution bus structures, such as a parallel port, game port, an IEEE 1394 Port (also known as a Firewire port), a serial port, or a universal serial bus (USB).

In yet another aspect, the display device 311 can also be connected to the system bus 313 via an interface, such as the display adapter 309. It is contemplated that the computer 301 can have more than one display adapter 309 and the computer 301 can have more than one display device 311. For example, a display device can be a monitor, an LCD (Liquid Crystal Display), or a projector. In addition to the display device 311, other output peripheral devices can comprise components such as speakers (not shown) and a printer (not shown) which can be connected to the computer 301 via the Input/Output Interface 310. Any step and/or result of the methods can be output in any form to an output device. Such output can be any form of visual representation, including, but not limited to, textual, graphical, animation, audio, tactile, and the like. The display 311 and computer 301 can be part of one device, or separate devices.

The computer 301 can operate in a networked environment using logical connections to one or more remote computing devices 314*a,b,c*. By way of example, a remote computing device can be a personal computer, portable computer, smartphone, a server, a router, a network computer, a peer device or other common network node, and so on. Logical connections between the computer 301 and a remote computing device 314*a,b,c* can be made via a network 315, such as a local area network (LAN) and/or a general wide area network (WAN). Such network connections can be through the network adapter 308. The network adapter 308 can be implemented in both wired and wireless environments. Such networking environments are conventional and commonplace in dwellings, offices, enterprise-wide computer networks, intranets, and the Internet.

For purposes of illustration, application programs and other executable program components such as the operating system 305 are illustrated herein as discrete blocks, although it is recognized that such programs and components reside at various times in different storage components of the computing device 301, and are executed by the one or more processors 303 of the computer. An implementation of the hosting optimization software 306 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media."

In an aspect, the computing device 301, executing the hosting optimization software 306, can be configured to retrieve a topology, characteristics, and a set of performance parameters for radial distribution grid 100 from the system memory 312, mass storage device 304, or network 315. Using the processor 303, the hosting optimization software 306 can create a lossless power flow model for radial distribution grid 100 based on its characteristics and topology. The lossless power flow model can then be stored in system memory 312 or mass storage device 304, or, optionally, to network 315. Further, using the processor 303, and based on the lossless power flow model, the hosting optimization software 306 can determine a maximum hosting capacity for radial distribution grid 100 and store the model in system memory 312, mass storage device 304, and/or to network 315. Then, using the determined maximum hosting capacity, the hosting optimization software 306 can also determine a number of additional distributed generators 110 that can be connected by the one or more distribution buses 112 to radial distribution grid 100 such that the performance parameters are met.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

Returning to FIG. 2A, a flowchart of the method 200 is depicted. At step 202, a topology and characteristics of a radial distribution grid 100 can be identified. As discussed above, the radial distribution grid 100 can be arranged in a tree-type configuration with a substation 103 at the top of the tree providing electrical power through one or more distribution lines 106 connected to one more one distribution buses 112, each of which having a given electrical load 108, and one or more distributed generators 110. The substation 103 may be connected by the distribution lines 106 to the upstream sub-transmission system 104, which in turn may be connected by the distribution lines 106 at the point of interest 102 to the radial distribution grid 100.

At step 204 a set of performance parameters for the radial distribution grid 100 are identified. Performance parameters can be, for example, distribution line 106 overload and distribution bus 112 overvoltage. As one skilled in the art can appreciate, additional or other performance parameters may be considered as well. To prevent violations of the performance parameters, real and reactive distribution line 106 flows can be constrained, and distribution bus 112 voltage magnitude may be limited. These constraints may help ensure that power flows provided to radial distribution grid 100 by distributed generators 110 do not cause a deterioration in performance parameters.

At step 206, a lossless power flow model for the radial distribution grid 100 can be determined. In some aspects, as a result of integrating additional distributed generators 110, an amount of nodal generation at one or more distribution buses 112 may change. Consequently, a network power flow may accordingly change. It may be important therefore to closely monitor the one or more performance parameters to ensure they are not negatively impacted. To study a potential impact, a full AC power flow model can be used to determine changes in the distribution line 106 power flows and the distribution bus 112 voltage magnitudes and phase angles. A majority of existing distribution power flow methods are nonlinear and typically must be solved in an iterative manner either through successive linearization around the current point of interest 102, or through successive updates of network quantities based on calculated increments. Some linear models are known in the art, but these models are mostly based on ZIP load models which may not be useful in modeling distributed generator 110 power generation. To address this issue, a linear power flow model can be employed.

An aspect of the invention considers generic line flow equations, such as equations (1) and (2) below, which represent the active and reactive power flows of distribution line 106 between any two distribution buses 112, m and n, respectively. In equation (1), $PL_{mn}^{max}$ is a maximum active power flow of a distribution line 106 for the distribution buses 112 $m$ and $n$; $g_{mn}$ is a conductance of distribution line 106 for distribution buses 112 $m$ and $n$; $v_m$ is a voltage magnitude at the distribution bus 112 $m$; and $\theta_m$ is a voltage phase angle at the distribution bus 112 $m$. In equation (2) $QL_{mn}$ is a reactive power flow at the distribution line 106 for the distribution buses 112 $m,n$; $b_{mn}$ is a susceptance of the distribution line 106 connecting the distribution buses 112 $m$ and $n$; and $\forall mn \in \cdot L$ signifies that the distribution lines 106 for the distribution buses 112 $m$ and $n$ are part of the distribution lines 106 of the radial distribution grid 100.

$$PL_{mn} = g_{mn}V_m^2 - g_{mn}V_mV_n \cos(\theta_m - \theta_n) - b_{mn}V_mV_n \sin(\theta_m - \theta_n) \quad \forall\, mn \in L \qquad (1)$$

$$QL_{mn} = -b_{mn}V_m^2 - b_{mn}V_mV_n \cos(\theta_m - \theta_n) - g_{mn}V_mV_n \sin(\theta_m - \theta_n) \quad \forall\, mn \in L \qquad (2)$$

As one skilled in the art can appreciate, equations (1) and (2) are nonlinear, as they include second order terms, the multiplication of variables, and trigonometric terms. Conductance and susceptance of the distribution lines 106 for the distribution buses 112 $m$ and $n$ represent real and imaginary components of the distribution line 106 admittance, respectively. They can be represented as follows in equations (3) and (4), where $r_{mn}$ is a resistance of the distribution lines 106 for the distribution buses 112 $m$ and $n$; and $x_{mn}$ is a reactance of the distribution lines 106 for the distribution buses 112 $m$ and $n$.

$$g_{mn} = r_{mn}^2/(r_{mn}^2 + x_{mn}^2) \quad \forall\, mn \in L \qquad (3)$$

$$b_{mn} = -x_{mn}^2/(r_{mn}^2 + x_{mn}^2) \quad \forall\, mn \in L \qquad (4)$$

In some aspects, when performing a steady state analysis of the radial distribution grid 100, it can be assumed that voltage magnitude and phase angle at the point of interest 102 where the radial distribution grid 100 is connected to the upstream sub-transmission system 104 are known and fixed. This is a valid assumption because, as noted previously, the upstream sub-transmission system 104 can be considered to be an infinite distribution bus 112 with a constant voltage magnitude. Assuming that voltage at point of interest 102 is 1∠0° p.u., all downstream distribution bus 112 voltages and phase angles can be represented as deviations from this value. In other words, the voltage magnitude in each distribution bus 112 can be defined as 1.0 p.u. plus the deviation from the point of interest 102 voltage magnitude, and a voltage phase angle of each distribution bus 112 can be defined as 0° plus the deviation from the point of interest 102 voltage angle. This relationship is represented in equations (5) and (6), below, where $\Delta V_m$ is a voltage magnitude deviation in the distribution bus 112 $m$; $\Delta\theta_m$ is a voltage phase angle deviation in the distribution bus 112 $m$; and $\forall m \in \cdot B$ shows that the distribution bus 112 $m$ is one of the one more distribution buses 112 of the radial distribution grid 100.

$$V_m = 1 + \Delta V_m \quad \forall\, m \in B \qquad (5)$$

$$\theta_m = 0 + \Delta\theta_m \quad \forall\, m \in B \qquad (6)$$

Those skilled in the art will understand that (5) and (6) may not add approximations to line flow equations; rather, they can simply redefine $V_m$ and $\theta_m$ using the point of interest 102 as a reference. Any other constant values can be considered for reference voltage magnitude and phase angle at the point of interest 102 without loss of generality. Therefore, two assumptions can be made to simplify the distribution line 106 flow equations. First, a difference in voltage angles of the adjacent distribution buses 112 $m$ and $n$ can be considered to be small, thus trigonometric terms can be approximated as follows (7) and (8).

$$\sin(\theta_m - \theta_n) \approx \theta_m - \theta_n = \Delta\theta_m - \Delta\theta_n \quad \forall\, mn \in L \qquad (7)$$

$$\cos(\theta_m - \theta_n) \approx 1 \quad \forall\, mn \in L \qquad (8)$$

Using equations (5)-(8), the distribution line 106 flow equations can be reformulated as shown in equations (9) and (10).

$$PL_{mn} = g_{mn}(1 + \Delta V_m)^2 - g_{mn}(1 + \Delta V_m)(1 + \Delta V_n) - b_{mn}(1 + \Delta V_m)(1 + \Delta V_n)(\Delta\theta_m - \Delta\theta_n) \quad \forall\, mn \in L \qquad (9)$$

$$QL_{mn} = -b_{mn}(1 + \Delta V_m)^2 - b_{mn}(1 + \Delta V_m)(1 + \Delta V_n) - g_{mn}(1 + \Delta V_m)(1 + \Delta V_n)(\Delta\theta_m - \Delta\theta_n) \quad \forall\, mn \in L \qquad (10)$$

A second assumption that can be made is that terms including the multiplication of $\Delta V$ and $\Delta\theta$ can be very small and can be ignored. In other words, it can be assumed that $\Delta V_m \Delta\theta_m = \Delta V_m \Delta\theta_n = \Delta V_n \Delta\theta_m = \Delta V_n \Delta\theta_n \approx 0$. This can be a reasonable assumption because both voltage magnitude and phase angle deviations from the point of interest 102 values may be small. Based on this assumption, the real and reactive distribution line 106 flows in equations (9) and (10) can be simplified, and then, by rearranging the terms, can be reformulated as in (11) and (12), respectively.

$$PL_{mn} = g_{mn}(\Delta V_m - \Delta V_n) + g_{mn}\Delta V_m(\Delta V_m - \Delta V_n) - b_{mn}(\Delta\theta_m - \Delta\theta_n) \quad \forall\, mn \in L \quad (11)$$

$$QL_{mn} = -b_{mn}(\Delta V_m - \Delta V_n) - b_{mn}\Delta V_m(\Delta V_m - \Delta V_n) - g_{mn}(\Delta\theta_m - \Delta\theta_n) \quad \forall\, mn \in L \quad (12)$$

Equations (11) and (12) represent real and reactive distribution line 106 flows, not based on actual distribution bus 112 voltage magnitudes and phase angles, but based on voltage magnitude and phase angle deviations from the voltage magnitude and phase angle of the point of interest 102. In both (11) and (12), the first and third terms can be linear, however, the second terms can be nonlinear. This nonlinearity can be taken care of in two successive steps. First, the nonlinear terms can be simply removed and the resultant linear distribution line 106 flow equations may be used to find a power flow. The power flow in some aspects can ensure that $PL_{mn}+PL_{nm}=0$ and $QL_{mn}+QL_{nm}=0$, thereby potentially making distribution line 106 losses zero—hence it can be considered a "lossless power flow." Second, $\Delta V_m$ values obtained from the lossless power flow can be considered as constants in the nonlinear terms in distribution line 106 flow equations (e.g., $\Delta\hat{V}_m(\Delta V_m - \Delta V_n)$, where $\Delta\hat{V}_m$ represents the already-calculated voltage magnitude obtained from the lossless power flow model. The nonlinear terms can now be converted into linear terms, which can further ensure that the approximation is much smaller than the lossless power flow model. In this example, $PL_{mn}+PL_{nm}\neq 0$ and $QL_{mn}+QL_{nm}\neq 0$, so these equations may consider line losses as well.

Those familiar with the state of the art may recognize that it if the $\Delta V_m$ value is calculated again and plugged back into the distribution line 106 flow equations, a more accurate solution may be achieved; however, the amount of change in voltage magnitudes and phase angles after the second step are usually minimal. Thus, for at least the aspects and embodiments described herein, this additional step is not considered. Nevertheless, those skilled in the art can appreciate that other aspects and embodiments of the methods and systems described herein may include the additional step.

Returning now to method 200, at step 208, based on the lossless power flow model, a maximum hosting capacity for the radial distribution grid 100 can be determined. The total installed distributed generator 110 capacity can be defined as the summation of the capacity for all distributed generators 110 installed at all distribution buses 112. The relationship can be represented as shown below, where U represents a set of uncertain parameters and $\Lambda$ represents a set of primal variables, discussed herein, and $P^G_M$ represents active power of distributed generation at the distribution bus 112 $m$.

$$\min_U \max_\Lambda \sum_{m \in B} P^G_m \quad (13)$$

To determine a maximum amount of hosting capacity for the radial distribution grid 100, equation (13) can be maximized over a set of "primal variables" denoted as $\Lambda$, and may be further minimized over a set of "uncertain parameters" denoted as U. Primal variables may include distributed generator 110 capacities, the distribution bus 112 voltage magnitudes and phase angles, real and reactive distribution line 106 flows, and real and reactive power exchange with the upstream sub-transmission system 104.

The uncertain parameters can include real and reactive electrical loads 108 in each distribution bus 112.

Hosting capacity is highly dependent on the distribution bus 112 electrical load 108 values. If the electrical load 108 values change in one or more distribution buses 112, a hosting capacity determination may accordingly change. In some embodiments, all possible load 108 variations can be considered when determining the hosting capacity using the uncertain parameters, U, and the minimum obtained solution, based on the of primal variables, $\Lambda$, can be considered as the final determination. In other embodiments, a worst-case analysis can be performed using robust optimization in which the maximum hosting capacity value is minimized over the set of uncertain parameters, U, which can comprise, among other parameters, one or more electrical loads 108. The electrical loads 108 can be assumed, by way of example, to change within a polyhedral uncertainty set. Therefore, the result of the worst-case analysis may be obtained without the need for considering all possible electrical load 108 variation scenarios. This approach can be robust against all realizations of the electrical load 108 variations. Consequently, if the electrical loads 108 become any value within their identified bounds, then a determined hosting capacity can remain constant. Accordingly, seasonal electrical load 108 variations may be effectively considered when determining a hosting capacity, thereby eliminating the need for repeated analysis when the electrical load 108 values change throughout the year (e.g., due to fluctuations in system usage during a given season, month, etc.). This determination is subject to operational constraints represented in constraints (14)-(26), shown below.

$$\sum_{c \in C_m} P^M_c + \sum_{n \in L_m} PL_{mn} + P^G_m = P^D_m \quad \forall\, m \in B, \quad (14)$$

where $P^D_m$ is an active electrical load 108 at the distribution bus 112 $m$. $P^G_m$ is active power output for a distributed generator 110 D at the distribution bus 112 $m$; $P^M_c$ is active power exchange with the upstream sub-transmission system 104 at the point of interest 102 $c$; and $PL_{mn}$ is active power flow at the distribution line 106 for the distribution buses 112 $m,n$.

$$\sum_{c \in C_m} Q^M_c + \sum_{n \in L_m} QL_{mn} + Q^G_m = Q^D_m \quad \forall\, m \in B, \quad (15)$$

where $Q^M_c$ is reactive power exchange with the upstream sub-transmission system 104 at the point of interest 102 $c$; $Q^D_m$ is reactive electrical load 108 at distribution bus 112 $m$; $Q^G_m$ and is reactive power of the distributed generator(s) 110 at the distribution bus 112 $m$.

$$PL_{mn} = g_{mn}(1 + \Delta \hat{V}_m)(\Delta V_m - \Delta V_n) - b_{mn}(\Delta \theta_m - \Delta \theta_n) \quad \forall\, mn \in L \quad (16)$$

$$QL_{mn} = -b_{mn}(1 + \Delta \hat{V}_m)(\Delta V_m - \Delta V_n) - g_{mn}(\Delta \theta_m - \Delta \theta_n) \quad \forall\, mn \in L \quad (17)$$

$$-P_c^{M,max} \le P_c^M \le P_c^{M,max} \quad \forall\, c \in C_m, \quad (18)$$

where $P_c^{M,max}$ is a maximum active power exchange with the upstream sub-transmission system 104 at the point of interest 102 $c$.

$$-Q_c^{M,max} \le Q_c^M \le Q_c^{M,max} \quad \forall\, c \in C_m, \text{ where } Q_c^{M,max} \quad (19)$$

is a maximum reactive power exchange with the upstream sub-transmission system 104 at the point of interest 102 $c$.

$$P_m^{D,min} \le P_m^D \le P_m^{D,max} \quad \forall\, m \in B, \quad (20)$$

where $P_m^{D,max}$ is an upper limit of the active electrical load 108 at the distribution bus 112 $m$; and $P_m^{D,min}$ is a lower limit of the active electrical load 108 at the distribution bus 112 $n$.

$$Q_m^{D,min} \le Q_m^D \le Q_m^{D,max} \quad \forall\, m \in B, \quad (21)$$

where $Q_m^{D,max}$ is an upper limit of the reactive electrical load 108 at the distribution bus 112 $m$; and $Q_m^{D,min}$ is a lower limit of the reactive electrical load 108 at the distribution bus 112 $m$.

$$-PL_{mn}^{max} \le PL_{mn} \le PL_{mn}^{max} \quad \forall\, mn \in L \quad (22)$$

$$-QL_{mn}^{max} \le QL_{mn} \le QL_{mn}^{max} \quad \forall\, mn \in L, \quad (23)$$

where $QL_{mn}^{max}$ is a maximum reactive power flow of the distribution line 106 for the distribution buses 112 $m$ and $n$.

$$\Delta V_m^{min} \le \Delta V_m \le \Delta V_m^{max} \quad \forall\, m \in B, \quad (24)$$

where $\Delta V_m^{min}$ is a lower limit of voltage magnitude deviation in the distribution bus 112 $m$; and $\Delta V_m^{max}$ is an upper limit of voltage magnitude deviation in the distribution bus 112 $m$.

$$\Delta V_m^{min} = V_m^{min} - 1 \quad \forall\, m \in B \quad (25)$$

$$\Delta V_m^{max} = V_m^{max} - 1 \quad \forall\, m \in B \quad (26)$$

Active power balance defined in constraint (14) can ensure that power generation from the distributed generators 110 installed on the radial distribution grid 100 plus the distribution line 106 flows in each distribution bus 112 will be equal to the electrical load 108 at a given distribution bus 112. Total power generation for all the distributed generators 110 can be considered as a free positive variable in all the distribution buses 112. If, for example, a given distribution bus 112 is the point of interest 102, then the power exchanged with the upstream sub-transmission system 104 is further considered in load balance determination. Likewise, reactive power balance represented by constraint (15) can ensure that a balance is met for reactive power at each distribution bus 112. Constraints (16) and (17) can represent active and reactive distribution line 106 flows, while constraints (18) and (19) may impose limits on active and reactive power exchange with the upstream sub-transmission system 104. In such an example, the power exchange may be considered as another free variable that can be positive (e.g., importing power from the upstream sub-transmission system 104) or negative (e.g., exporting power to the upstream sub-transmission system 104), or zero (e.g., no power exchange). Constraints (20) and (21) can represent the electrical load 108 variations, which can be limited by, for example, a lower bound and/or an upper bound. These bounds can be obtained based on historical electrical load 108 data. Because the electrical loads 108 can freely change within their associated lower and/or an upper bounds, the selected values to be used for these bounds may result from the abovementioned worst-case hosting capacity approach using electrical load 108 variations.

The hosting capacity determination at step 208 can be achieved, in some embodiments, using a linear approach. FIG. 2B depicts a flowchart detailing an exemplary embodiment of method step 208 using the linear approach. Initially, at step 208A, the radial distribution grid's 100 topology and characteristics can be selected along with a set of selected performance measures. At steps 208B and 208C, hosting capacity can be determined ignoring power flow losses, based on, for example, the lossless power flow model described above. This can be referred to as a "lossless hosting capacity model." At step 208B the lossless hosting capacity model 208C can be determined using equations (11)-(15) and/or equations (18)-(26). At step 208D, a full power flow model can be determined using the results for $\Delta V_m$ 208E that were obtained from the lossless hosting capacity model 208C determined at step 208B. It should be noted that $\Delta V_m$ 208E can be a constant that can linearize nonlinear terms using equations (13)-(26). This may result in a hosting capacity model that can consider power flow losses 208F. Finally, at step 210 of method 200, based on the maximum hosting capacity, a determination can be made regarding a number of additional distributed generators 110 that can be added to the radial distribution grid 100 while maintaining performance parameters. The specific number of additional distributed generators 110 can depend upon, among other things, the topology of the radial distribution grid 100, several examples of which are discussed below.

Figure 4:
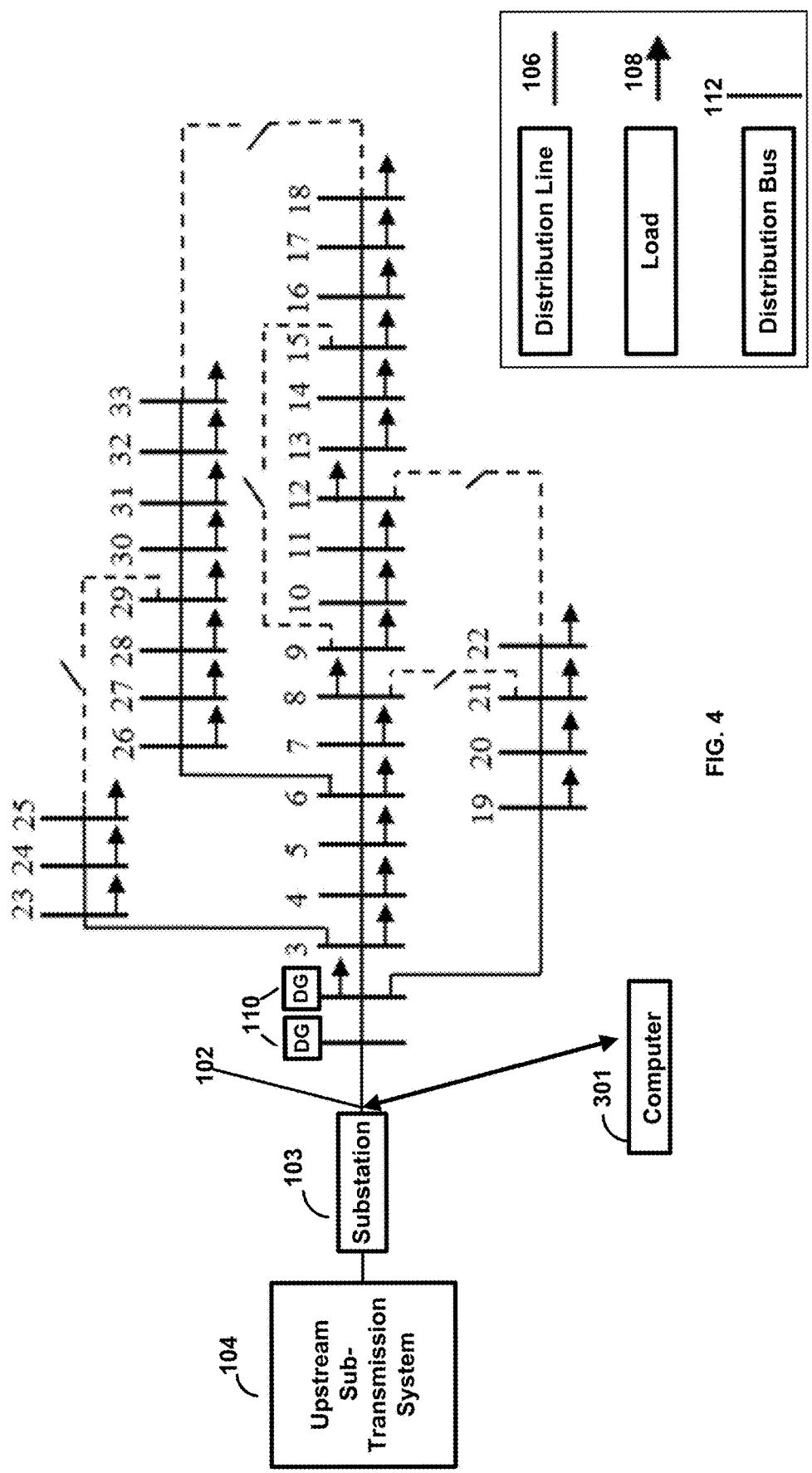
FIG. 4 shows an exemplary radial distribution grid.

FIG. 4 depicts a radial distribution grid 400, which is an exemplary embodiment of the radial distribution grid 100, comprising 33 distribution buses 112, each of which are individually numbered in FIG. 4 as 1-33 and referred to herein as distribution bus 112-1 through distribution bus 112-33. The following sections detail several examples of the disclosed methods and systems implemented using the computer system depicted in FIG. 3 and the radial distribution grid 400. Before the examples are described, it should be noted that several assumptions can be made for various features of the radial distribution grid 400. These assumptions are for illustrative purposes only, and they are not meant to limit the topology or features of distribution grids on which the disclosed methods and systems can be implemented.

As a first assumption, one or more of the electrical loads 108 can be initially set to be a constant value—called a "base" electrical load 108. Also, to account for inherent uncertainty of electrical loads 108 within the radial distribution grid 400, an uncertainty range having an upper bound and/or a lower bound can be defined. For each distributed generator 110, a maximum power output can be assumed to be equal to its installed capacity, and a minimum power output can be assumed to be zero. Voltage at point of interest 102 can be assumed to be 1 p.u. with a phase angle of 0°. The computer 301 may be in communication with the radial distribution grid 400 and the upstream sub-transmission system 104 at the point of interest 102. By considering respective minimum and maximum distribution bus 112 voltage limits of 0.9 p.u. and 1.1 p.u., lower and upper voltage deviation limits can be obtained as −0.1 p.u. and 0.1 p.u., respectively. Active power exchanged with the upstream sub-transmission system 104 can be capped, for these examples, at 4.6 megawatts.

Example 1 uses the linear power flow model, described earlier, to provide comparisons with a nonlinear full AC power flow model. This comparison can show the accuracy of the developed linear power flow model and furthermore may allow integration with the hosting capacity determination (e.g., method 200 and system 300). Examples 1 and 2 use the optimization-based method detailed above to determine a hosting capacity while considering all the distribution buses 112-1 to 112-33 simultaneously. Example 1 focuses on a base electrical load 108 (e.g., one single load snapshot of an electrical load 108 at a given distribution bus 112), while Example 2 captures electrical load 108 uncertainty. The comparison of results between these two examples can show a tradeoff which may occur when uncertainties are considered. Examples 3 and 4 further elaborate upon results of Example 2 by analyzing a sensitivity of a hosting capacity result on performance parameters (e.g., distribution line 106 overload and distribution bus 112 overvoltage). Example 5 provides comparisons with a traditional iteration-based hosting capacity determination method against the hosting capacity determination used in the disclosed methods and systems. Examples 1, 2, and 3 can be considered under three scenarios. In scenario 1, all the distribution buses 112-1 to 112-33 can be considered for distributed generator 110 installation. In scenario 2, distributed generator 110 installations are at distribution buses 112-2 and 112-3 only, because, in this example, these two distribution buses 112 are directly connected to the distribution lines 106 having the highest-capacity in the radial distribution grid 400. In scenario 3, distributed generator 110 installations are at end distribution buses 112 only (e.g., distribution buses 112-18, 112-22, 112-25, and 112-33).

Figure 5:
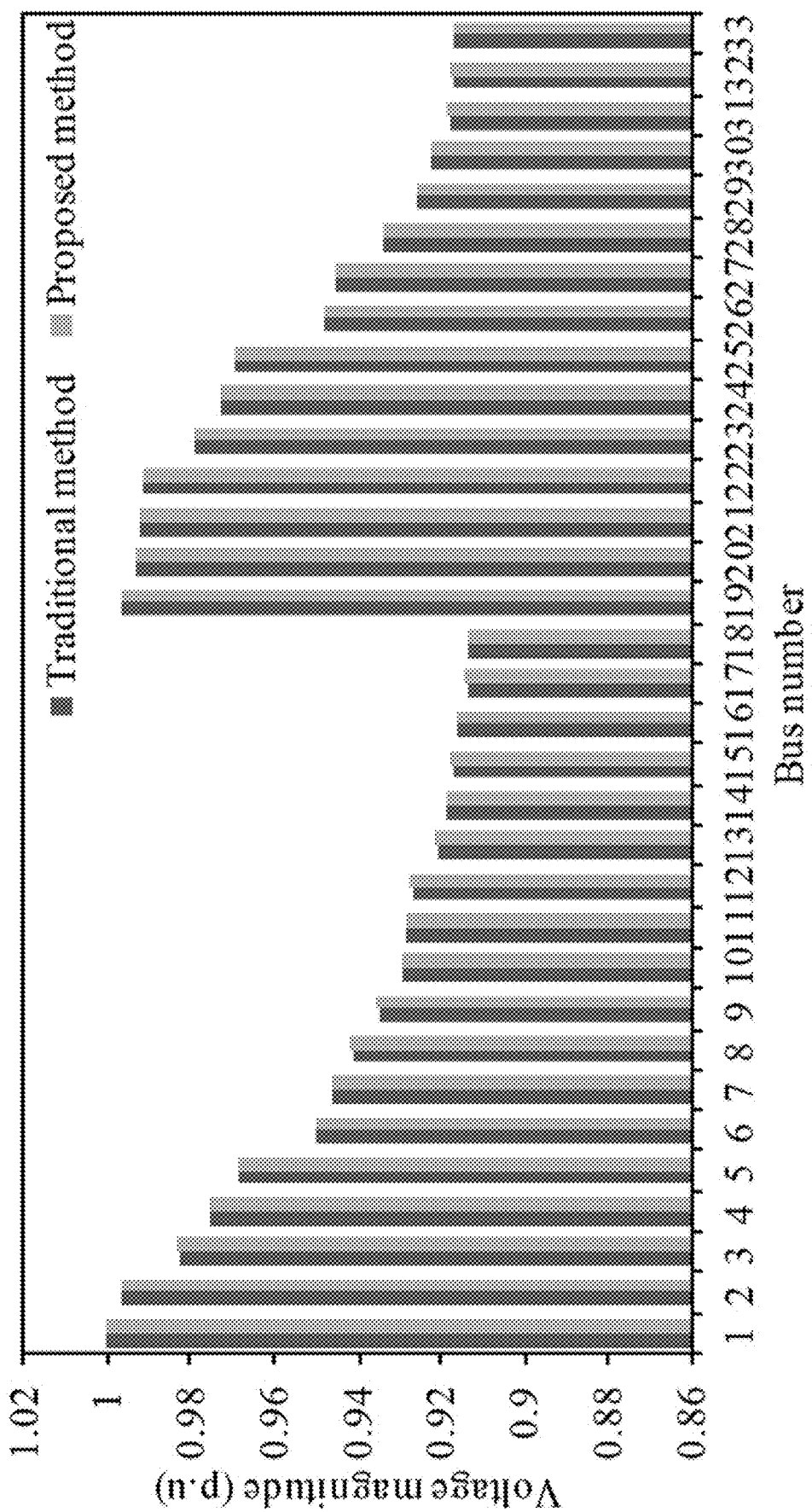
FIG. 5 shows a bar graph of voltage magnitudes for distribution buses of an exemplary radial distribution grid.

Example 1: A linear power flow can be applied to the radial distribution grid 400 to create a power flow model and compare it with those of nonlinear AC power flow analysis. Results obtained from a linearized method compared with a nonlinear method may show an average percent error for voltage magnitudes, voltage phase angles, distribution line 106 flows, and total distribution line 106 losses of 0.002%, 16.2%, 0.21%, and 9.4%, respectively. The results indicate a potentially high accuracy in determining voltage magnitude and distribution line 106 flows. While this accuracy may be less for voltage phase angles, it should be noted that voltage phase angles may be less important factors in the radial distribution grid 400 power flow analysis when compared to voltage magnitudes, because their impact on distribution line 106 flows can be seen from line flow equations. The average values of the percent error may be found by first calculating a percent error for each individual distribution bus 112/distribution line 106, and then averaging across all distribution buses 112/distribution lines 106. The bar graph depicted in FIG. 5 shows voltage magnitude results in each distribution bus 112 for the traditional, iterative approach compared to the approach used by the disclosed methods and systems.

Example 2: In this case, the radial distribution grid 400 hosting capacity is determined using a base case electrical load 108 under three scenarios. Hosting capacity in scenario 1 considers distributed generators 110 installed at distribution buses 112-2, 112-19, and 112-20 with capacities of 7624 kW, 90 kW, and 770 kW, respectively, resulting in a hosting capacity of 8484 kW. This result is shown in FIG. 6. Hosting capacity can be limited by a maximum acceptable active power flow through distribution lines 106 connected to distribution bus 112-1. In scenario 2, for which distributed generators 110 can be placed only at distribution buses 112-1 and 112-3, hosting capacity is 8484 kW, with a difference from scenario 1 being that distributed generators 110 are installed at distribution bus 112-2. This scenario can explore a variation for which an influence of distribution line 106 capacity limits is weakest (e.g., limiting an optimal placement of distributed generators 110). This can highlight a bottlenecking role that distribution lines 106 may play in the radial distribution grid 400. In scenario 3, where the distributed generators 110 are installed at end distribution buses 112 only, hosting capacity results in installations at distribution buses 112-18, 112-22, 112-25 and 112-33 are determined to be 190 kW, 200 kW, 920 kW, and 160 kW, respectively, for a total hosting capacity of 1470 kW. The distribution line 106 losses decreased by 34.7% in this scenario, but overall hosting capacity decreased by 82.7% when compared with the first two scenarios. This result could be foreseen, because the end-distribution buses 112 are connected to distribution lines 106 that have smaller capacities compared to other distribution buses 112.

Figure 8:
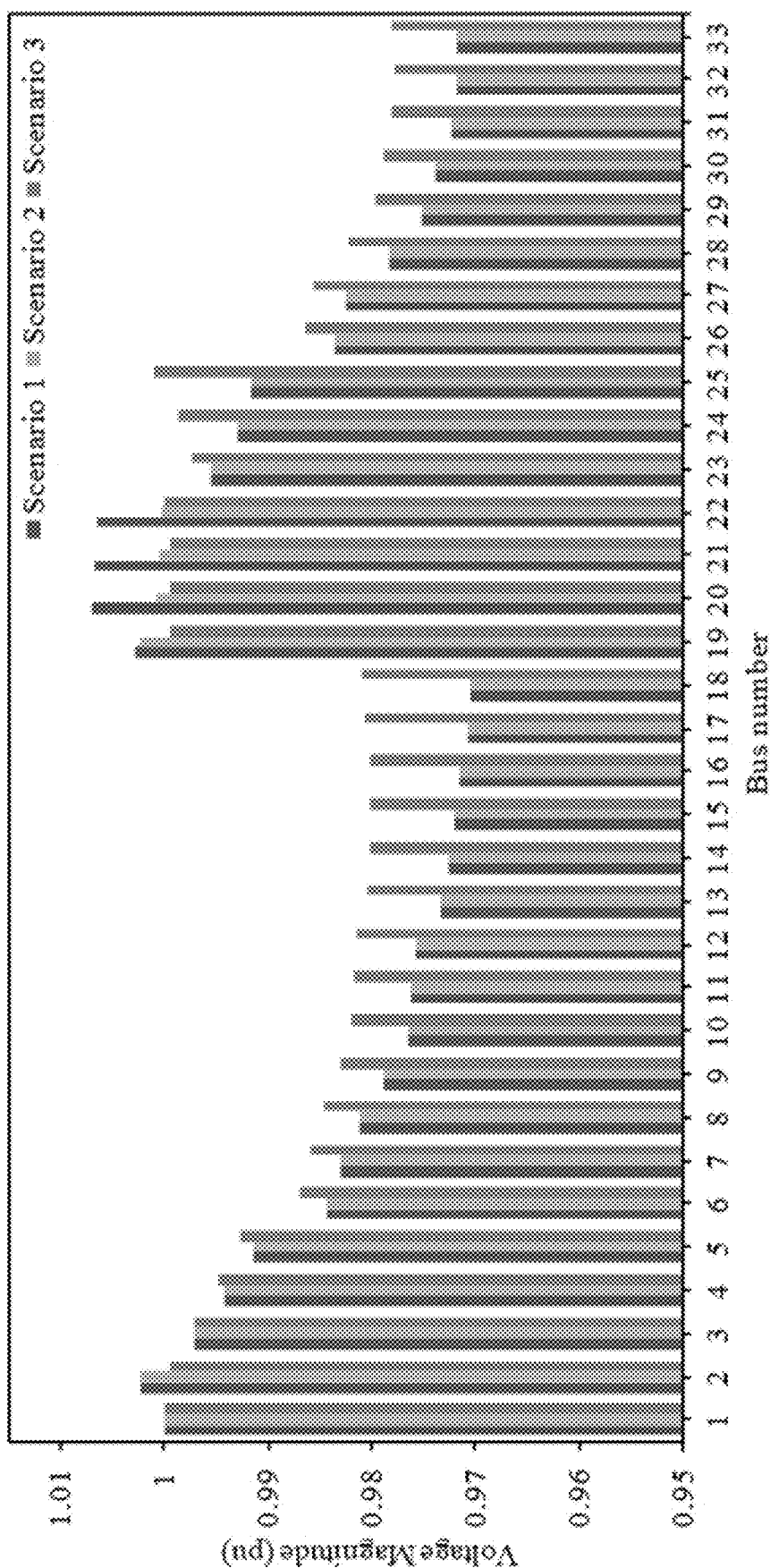
FIG. 8 shows a bar graph of voltage magnitudes for distribution buses of an exemplary radial distribution grid.

Example 2: Using uncertainty electrical load 108 data, hosting capacity can be calculated for the same three scenarios used in Example 2 and the results are summarized in FIG. 7. Minimum/maximum electrical load 108 recorded over a year-long horizon can be considered as lower/upper bounds of uncertain electrical load 108 in each distribution bus 112. Since a worst-case solution can be obtained based on this uncertain electrical load 108 profile, hosting capacity may not result in unacceptable performance for other electrical load 108 profiles. FIG. 8 is a graph showing that total real and reactive base electrical load 108 in Example 2 can be 3715 kW and 2300 kVAR, respectively, while real and reactive electrical load 108 may change in a range of [1490 kW, 3715 kW] and [922.5 kVAR, 2300 kVAR], respectively.

For scenario 1, total hosting capacity may be determined to be 6116 kW with distributed generators 110 being placed in distribution buses 112-2, 112-19, and 112-20. Similar to Example 2, scenario 2 considers all distributed generators 110 placed at distribution bus 112-2. As in Example 2, the capacity of distribution line 106 connecting the radial distribution grid 400 to the upstream sub-transmission system 104 may be a limiting factor. The results here may be considered more reliable, as they can demonstrate a minimum expected hosting capacity when including electrical load 108 uncertainty (e.g., the obtained result may still be valid for any other realizations of electrical loads 108). Comparing the obtained solution in these two scenarios, hosting capacity may be reduced down to 63.15% of hosting capacity in Example 2. For scenario 3, hosting capacity can be determined to be 1074 kW and losses are reduced by 63.4%. Power flow capacities at distribution lines 106 for distribution buses 112-17, 112-21, 112-24, and 112-32 could be limiting hosting capacity in this scenario. The obtained results in this case can exemplify that when handling a worst-case load profile, the radial distribution grid 400 may not be able to accommodate more than 72% of a base electrical load 108 hosting capacity. This can indicate that distribution line 106 capacities may limit hosting capacity. FIG. 8 shows the voltage magnitudes for the three studied scenarios. It can be seen from FIG. 8 that the voltage never dips below 0.96 p.u. and thus falls within the acceptable range of 0.90 p.u. to 1.1 p.u.

Figure 9:
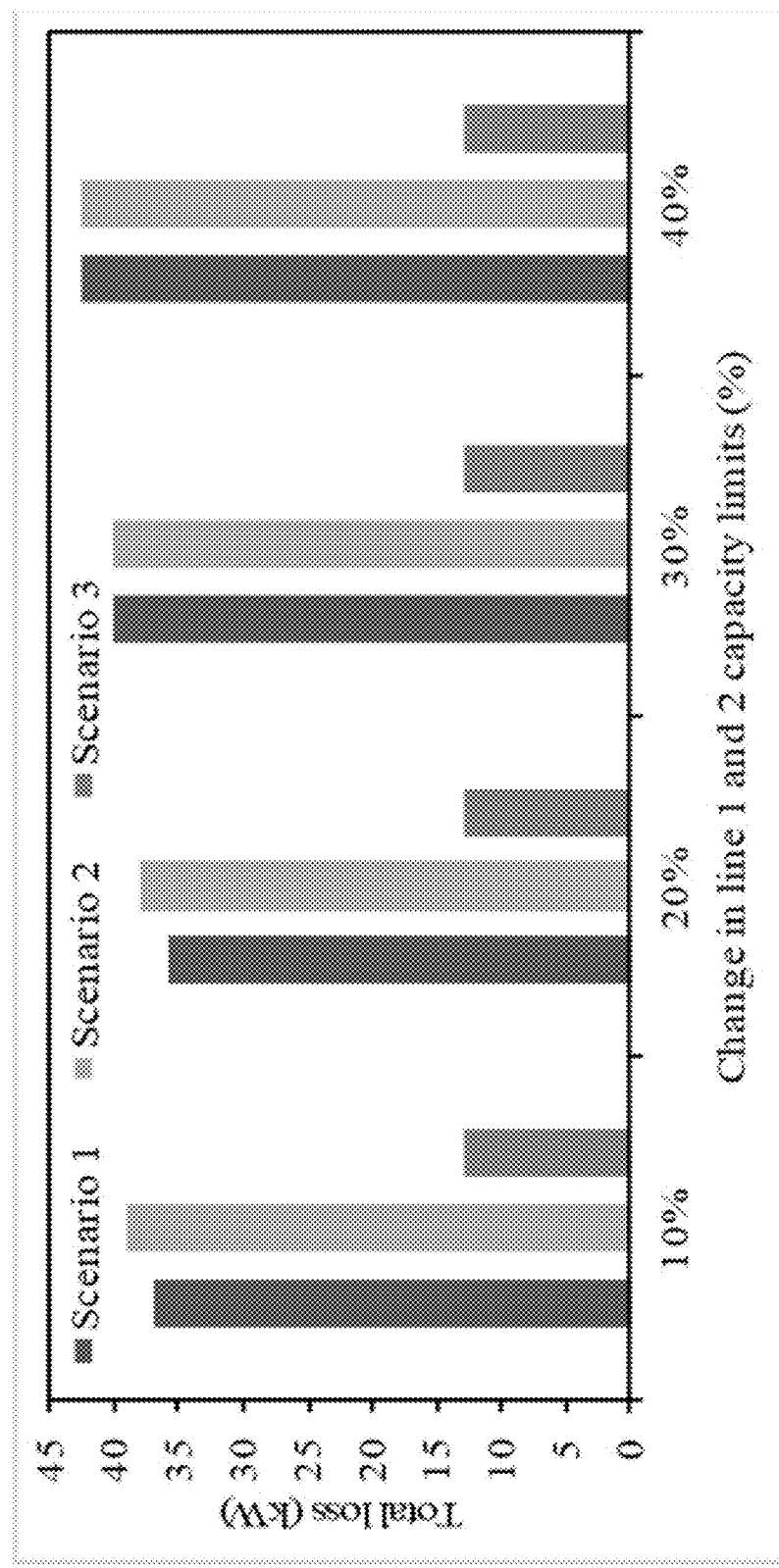
FIG. 9 shows a bar graph showing values of hosting capacity for an exemplary radial distribution grid where the hosting capacity is a function of distribution line capacity.

Example 3: In this example, a sensitivity of hosting capacity results with respect to distribution line 106 capacities is studied. The distribution line 106 flow limits are changed to reflect capacity upgrades to specific distribution lines 106 instead of upgrading all the distribution lines 106. Similar to Example 2, this case explores what the worst-case solutions for a given performance parameter for the same scenarios are. This is reflected in the problem by increasing the distribution line 106 limits in Examples 1 and 2. Examples 1 and 2 can highlight a role that these distribution lines 106 play in hosting capacity. The capacity limits of distribution lines 106 can be increased by 10% increments up to 40%, and FIG. 9 shows a bar graph depicting the hosting capacity as a function of the distribution line 106 capacity limit variations.

Figure 10:
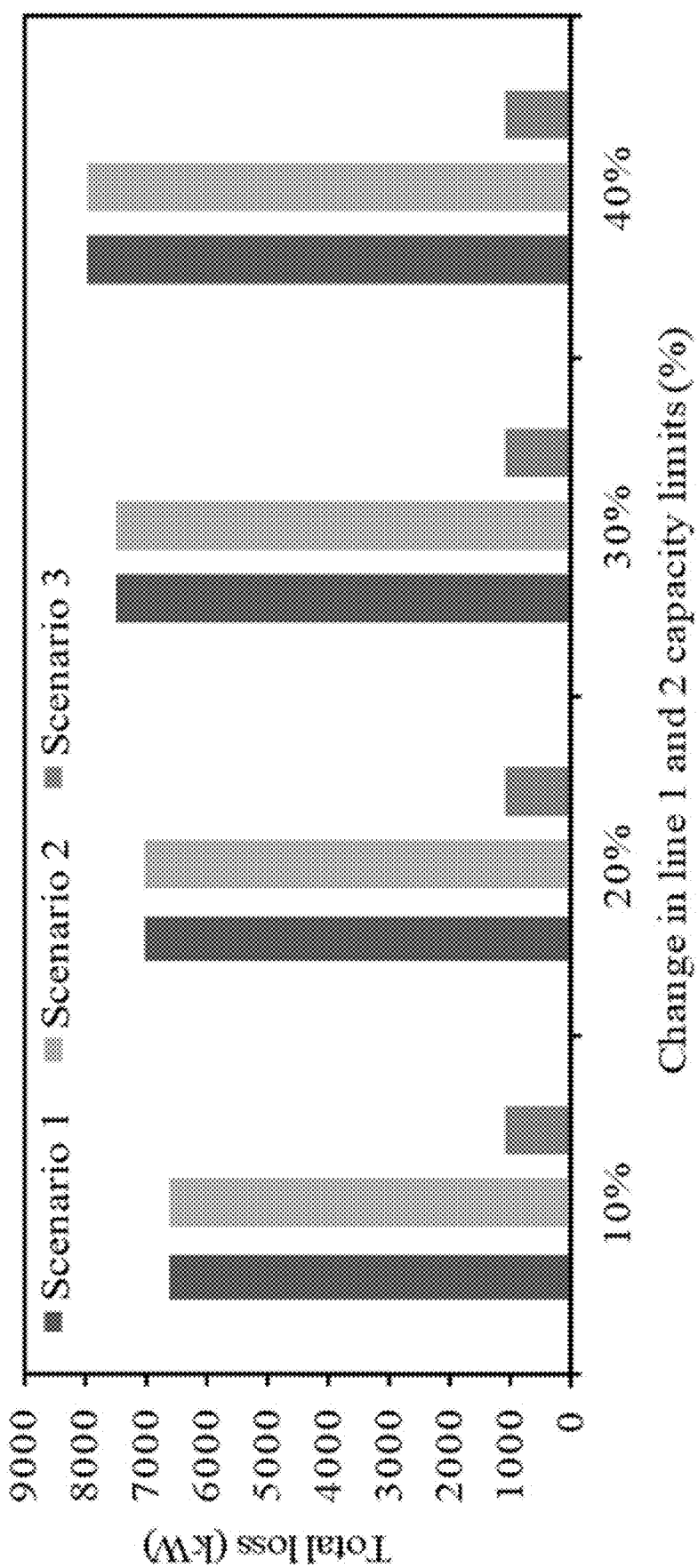
FIG. 10 shows a bar graph showing changes of hosting capacity for an exemplary radial distribution grid based on a change in line capacity for two distribution lines of the radial distribution grid.
Figure 11:
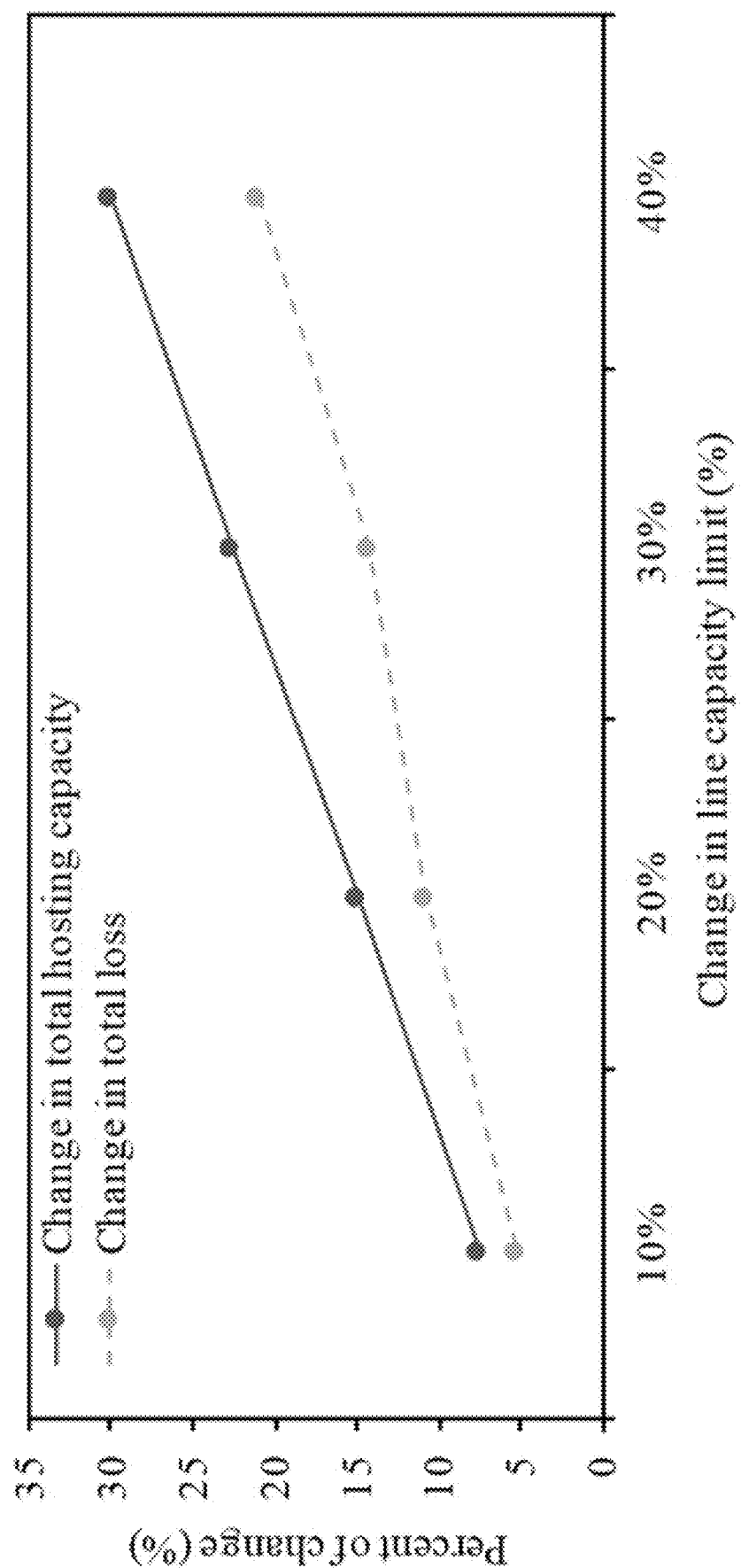
FIG. 11 shows a line graph showing changes of hosting capacity for an exemplary radial distribution grid based on changes in distribution line capacity limits.

For the first two scenarios, hosting capacity can be increased by 7.5%, 15%, 22.5% and 30% when the capacity limits of the distribution lines 106 are increased by 10%, 20%, 30% and 40% respectively. However, hosting capacity in the last scenario may not improve as adjusted distribution line 106 limits are not met, and thus are not involved, in hosting capacity determination. FIG. 10 shows a bar graph depicting a potential change in losses due to an increase in the distribution line 106 capacity limits. As hosting capacity was increased in the first two scenarios, total losses also increases by 5.2%, 10.8%, 14.2%, and 22% for the distribution line 106 limit increases of 10%, 20%, 30% and 40% respectively. However, there may not be a change in total losses of the last scenario as the model may not change in response to an increase in the distribution line 106 limits. Hosting capacity was shown to possibly be limited by the distribution line 106 capacity limits in scenarios 1 and 2, which indicates that hosting capacity may be positively affected by an increase in the distribution line 106 capacity. Hosting capacity results in scenario 3, however, remain unaffected as their limitations may be due to the distribution line 106 capacities in multiple smaller distribution lines 106 elsewhere in the radial distribution grid 400. FIG. 10 re-expresses the data as a percent change in hosting capacity and total losses as the distribution line 106 limits are changed. FIG. 11 is a line graph highlighting that, in some aspects, local upgrades to the distribution lines 106 can increase total hosting capacity.

Figure 13:
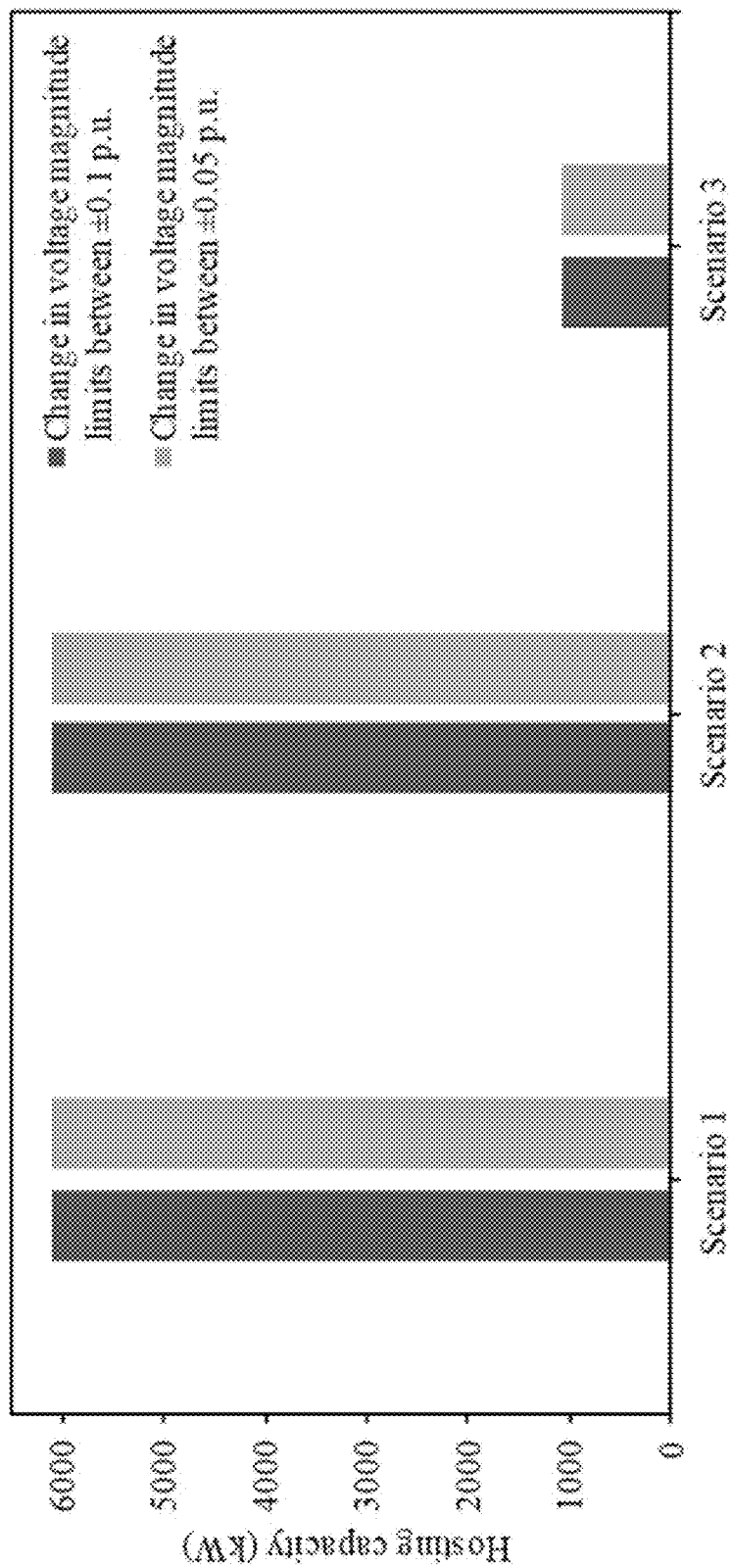
FIG. 13 shows a bar graph showing changes in voltage magnitude deviations for several distribution buses of an exemplary radial distribution grid.

Example 4: In this example, a change in hosting capacity with respect to voltage magnitude limits is considered by reducing voltage deviation limits to ±0.05 p.u. The hosting capacity results in this case are compared to those of Example 2 and shown in FIG. 13 using the same uncertain electrical load 108 data. The comparison can show that there may not be a change in hosting capacity results; however, the location of distributed generator 110 in scenario 1 is changed to distribution bus 112-2. This is done to show that one or more of the downstream distribution buses 112 may reach their voltage limit, causing distributed generator 110 installation to be moved to distribution bus 112-2. FIG. 12 shows a comparison the solution for the two considered voltage deviation limits—0.1 p.u. and ±0.05 p.u.

Figure 14:
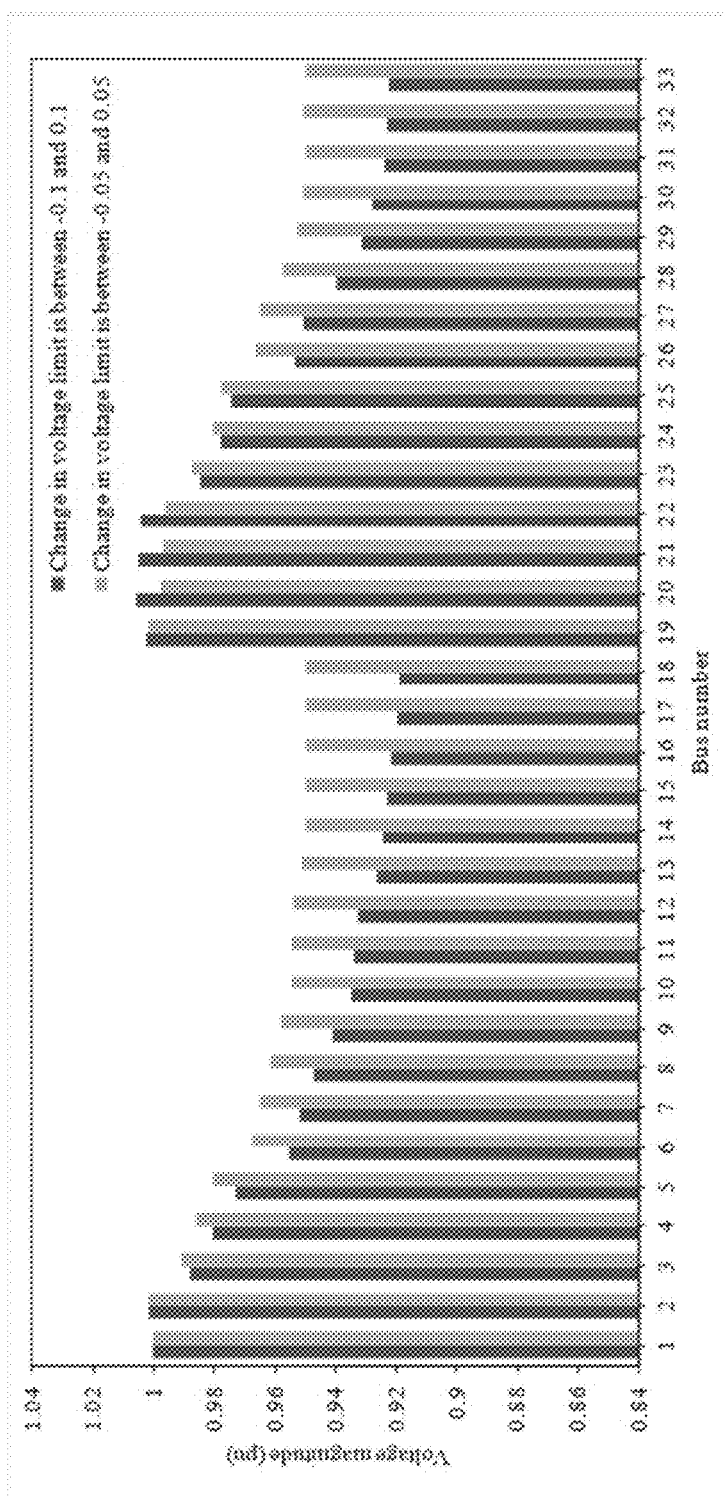
FIG. 14 shows a bar graph showing voltage magnitudes for several distribution buses of an exemplary radial distribution grid based on a base electrical load.

The tighter voltage limits in the base electrical load 108 analysis may lead to a reduction in hosting capacity results. The result, in this example, decreased from 8484 kW to 8400 kW, as voltage magnitude at distribution buses 112-15 through 112-18, 112-32, and 112-33 reached a limit of 0.95 p.u., as depicted in FIG. 14. This may be expected, since a reduction in allowed voltage fluctuations can mean that a smaller hosting capacity can be accepted. Comparing the uncertain electrical load 108 before and after implementing the reduction of the change in voltage deviation limits indicates that hosting capacity for an electrical load 108 remains unchanged.

Example 5: In this example, performance of the disclosed methods and systems is compared against the traditional iterative approach. Performance is checked in terms of the accuracy of hosting capacity determination and the computation time. With the traditional approach, power flow for all possible distributed generator 110 site and/or size combinations are first determined, which can require an extensive computation effort. This may be especially true if a large search space is considered, as this can require many determinations of power flow for each distributed generator 110 site and/or size combination. Due to the simplicity of linear programming, many drawbacks of the traditional approach may be avoided. Thus, it is expected that a lower computation time may be observed using the disclosed methods and systems, thereby increasing the speed at which a hosting capacity can be determined.

Figure 15:
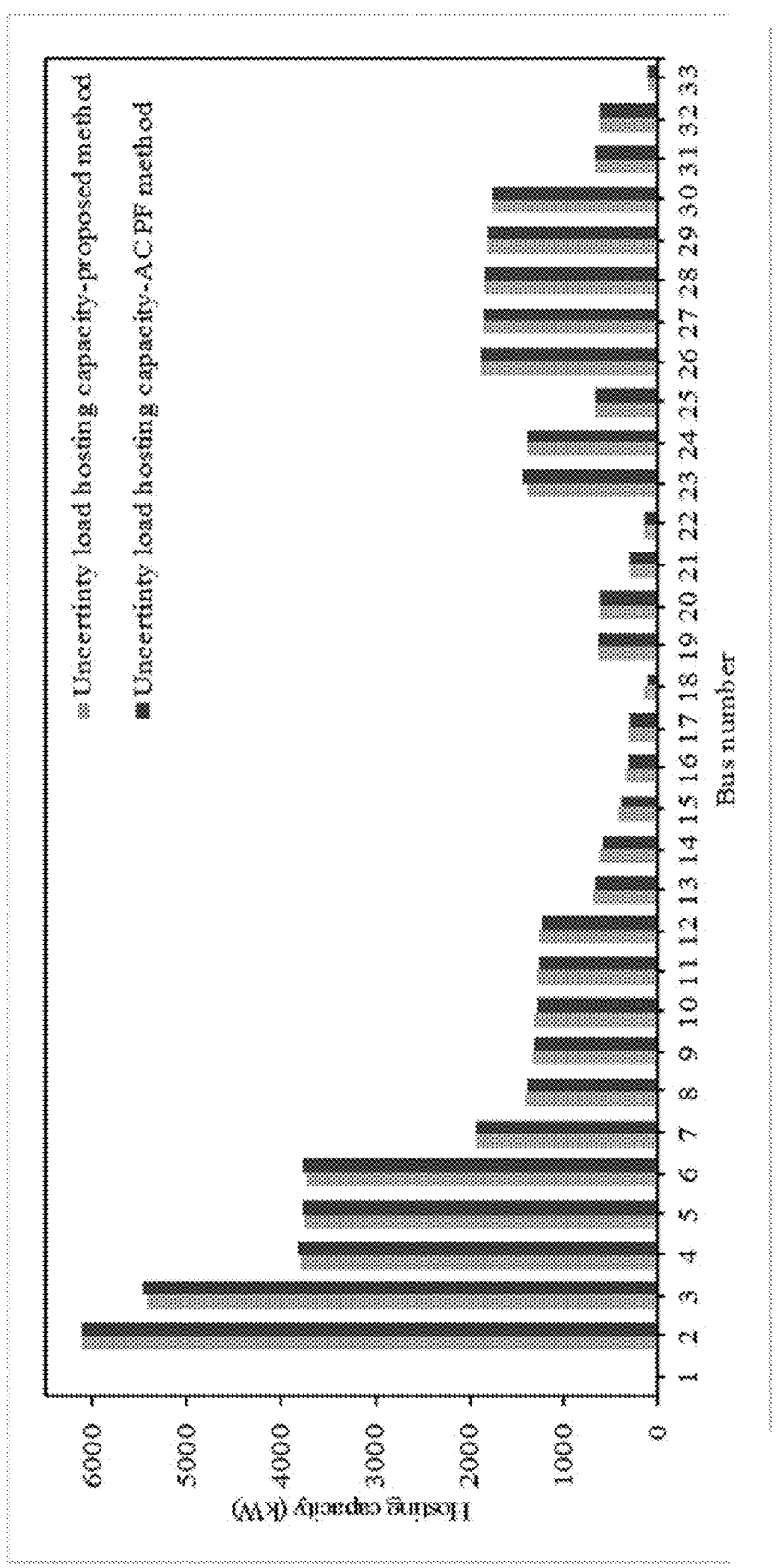
FIG. 15 shows a bar graph showing hosting capacity determinations for each distribution bus of an exemplary radial distribution grid.

For a first comparative study, individual hosting capacities can be determined for each distribution bus 112 assuming there are no distributed generator 110 installations at other distribution buses 112 (e.g., ignoring spatial interdependency). Each distribution bus's 112 individual hosting capacity can be optimized for an uncertain electrical load 108 profile. FIG. 15 compares hosting capacity results for each individual distribution bus 112 using the disclosed methods and systems and the traditional iterative approach.

As shown by FIG. 15, the results may be very similar. The time required to determine hosting capacity using the disclosed methods and systems may be as little as 2 seconds, while the computation time using the traditional iterative approach may be as high as 359 seconds. The average percent error of the disclosed methods and systems may be as small as 1.08% compared to the traditional iterative approach. These results indicate it is possible to significantly improve computation speed and acceptable accuracy that the disclosed methods and systems may provide compared against the traditional iterative approach when analyzing single-distribution bus 112 hosting capacities.

In the second comparative study, the disclosed methods and systems and the traditional method are both used to compute hosting capacity when all the distribution buses 112 are considered. The traditional approach can take as long as 84 hours to complete, while the disclosed methods and systems can make a determination in as fast as 21 seconds. An average percent difference in final solution may be as small as 1.2%. These examples indicate that the disclosed methods and systems (e.g., method 200 and system 300) can be quite accurate and efficient.

While the disclosed methods and systems have been described in connection with preferred embodiments and specific examples, it is not intended that the scope be limited to the particular embodiments set forth, as the embodiments herein are intended in all respects to be illustrative rather than restrictive. Unless otherwise expressly stated, it is in no way intended that any method set forth herein be construed as requiring that its steps be performed in a specific order.

Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A method comprising:
   determining, by a computing device, based on a set of performance parameters associated with a radial distribution grid, one or more voltage magnitude deviations associated with the radial distribution grid and one or more voltage phase angle deviations associated with the radial distribution grid;
   determining, based on the one or more voltage magnitude deviations and based on the one or more voltage phase angle deviations, a lossless power flow model for the radial distribution grid;
   determining, based on the lossless power flow model, a maximum hosting capacity of the radial distribution grid; and
   causing, based on the maximum hosting capacity and the set of performance parameters, placement of an optimal number of distributed generators at one or more locations associated with at least one distribution bus of a plurality of distribution buses.

2. The method of claim 1, further comprising:
   receiving topology data associated with the radial distribution grid; and
   determining, based on the topology data, the set of performance parameters associated with the radial distribution grid.

3. The method of claim 1, wherein the radial distribution grid comprises the plurality of distribution buses and a plurality of distributed generators.

4. The method of claim 3, wherein the radial distribution grid is connected, at a point of interest, to a substation of an upstream sub-transmission system, and wherein the point of interest is adjacent to the substation and is one of the plurality of distribution buses.

5. The method of claim 3, wherein determining, based on the lossless power flow model, the maximum hosting capacity of the radial distribution grid comprises:
   determining a maximum hosting capacity for each distribution bus of the plurality of distribution buses; and
   determining an aggregate hosting capacity of the radial distribution grid, wherein the aggregate hosting capacity is a summation of the maximum hosting capacity for each distribution bus of the plurality of distribution buses.

6. The method of claim 3, wherein the set of performance parameters for the radial distribution grid comprises predetermined electrical loads transmitted by distribution lines associated with the plurality of distribution buses and predetermined voltage magnitudes for the plurality of distribution buses.

7. The method of claim 3, wherein each distributed generator of the plurality of distributed generators comprise one or more of a solar photovoltaic panel, a wind turbine, or a diesel generator.

8. The method of claim 1, wherein determining, based on the one or more voltage magnitude deviations and based on the one or more voltage phase angle deviations, the lossless power flow model for the radial distribution grid comprises:
   determining, based on the one or more voltage magnitude deviations and based on the one or more voltage phase angle deviations, real power flows and reactive power flows; and
   determining, based on the real power flows and the reactive power flows, the lossless power flow model for the radial distribution grid.

9. The method of claim 8, wherein determining, based on the one or more voltage magnitude deviations and based on the one or more voltage phase angle deviations, the real power flows and the reactive power flows comprises:
   determining a first voltage magnitude deviation between a voltage magnitude at a point of interest of the radial distribution grid and a voltage magnitude at a distribution bus of the radial distribution grid downstream from the point of interest;
   determining a second voltage magnitude deviation between the voltage magnitude at the point of interest and a voltage magnitude at a distribution bus of the radial distribution grid adjacent to the distribution bus downstream from the point of interest;
   determining a first voltage phase angle deviation between a voltage phase angle at the point of interest and a voltage phase angle at the distribution bus downstream from the point of interest;
   determining a second voltage phase angle deviation between the voltage phase angle at the point of interest and a voltage phase angle at the distribution bus adjacent to the distribution bus downstream from the point of interest; and
   determining the real power flows and the reactive power flows based on the first voltage magnitude deviation, the second voltage magnitude deviation, the first voltage phase angle deviation, and the second voltage phase angle deviation.

10. The method of claim 9, wherein the voltage magnitude at any given distribution bus of the radial distribution grid downstream from the point of interest is defined as 1.0 p.u. plus a deviation between the voltage magnitude at the point of interest and the voltage magnitude at the given distribution bus, and wherein the voltage phase angle at any given distribution bus of the radial distribution grid downstream from the point of interest is defined as 0° plus a deviation between the voltage phase angle at the point of interest and the voltage phase angle at the given distribution bus.

11. An apparatus comprising:
    one or more processors; and
    a memory storing processor-executable instructions that, when executed by the one or more processors, cause the apparatus to:
       determine, based on a set of performance parameters associated with a radial distribution grid, one or more voltage magnitude deviations associated with the radial distribution grid and one or more voltage phase angle deviations associated with the radial distribution grid;

determine, based on the one or more voltage magnitude deviations and based on the one or more voltage phase angle deviations, a lossless power flow model for the radial distribution grid;

determine, based on the lossless power flow model, a maximum hosting capacity of the radial distribution grid; and cause, based on the maximum hosting capacity and the set of performance parameters, placement of an optimal number of distributed generators at one or more locations associated with at least one distribution bus of a plurality of distribution buses.

12. The apparatus of claim 11, wherein the processor-executable instructions, when executed by the one or more processors, further cause the apparatus to:

receive topology data associated with the radial distribution grid; and determine, based on the topology data, the set of performance parameters associated with the radial distribution grid.

13. The apparatus of claim 11, wherein the radial distribution grid comprises the plurality of distribution buses and a plurality of distributed generators.

14. The apparatus of claim 13, wherein the radial distribution grid is connected, at a point of interest, to a substation of an upstream sub-transmission system, and wherein the point of interest is adjacent to the substation and is one of the plurality of distribution buses.

15. The apparatus of claim 13, wherein the processor-executable instructions that, when executed by the one or more processors, cause the apparatus to determine, based on the lossless power flow model, the maximum hosting capacity of the radial distribution grid, further cause the apparatus to:

determine a maximum hosting capacity for each distribution bus of the plurality of distribution buses; and determine an aggregate hosting capacity of the radial distribution grid, wherein the aggregate hosting capacity is a summation of the maximum hosting capacity for each distribution bus of the plurality of distribution buses.

16. The apparatus of claim 13, wherein the set of performance parameters for the radial distribution grid comprises predetermined electrical loads transmitted by distribution lines associated with the plurality of distribution buses and predetermined voltage magnitudes for the plurality of distribution buses.

17. The apparatus of claim 13, wherein each distributed generator of the plurality of distributed generators comprise one or more of a solar photovoltaic panel, a wind turbine, or a diesel generator.

18. The apparatus of claim 11, wherein the processor-executable instructions that, when executed by the one or more processors, cause the apparatus to determine, based on the one or more voltage magnitude deviations and based on the one or more voltage phase angle deviations, the lossless power flow model for the radial distribution grid, further cause the apparatus to:

determine, based on the one or more voltage magnitude deviations and based on the one or more voltage phase angle deviations, real power flows and reactive power flows; and determine, based on the real power flows and the reactive power flows, the lossless power flow model for the radial distribution grid.

19. The apparatus of claim 18, wherein the processor-executable instructions that, when executed by the one or more processors, cause the apparatus to determine, based on the one or more voltage magnitude deviations and based on the one or more voltage phase angle deviations, the real power flows and the reactive power flows, further cause the apparatus to:

determine a first voltage magnitude deviation between a voltage magnitude at a point of interest of the radial distribution grid and a voltage magnitude at a distribution bus of the radial distribution grid downstream from the point of interest;

determine a second voltage magnitude deviation between the voltage magnitude at the point of interest and a voltage magnitude at a distribution bus of the radial distribution grid adjacent to the distribution bus downstream from the point of interest;

determine a first voltage phase angle deviation between a voltage phase angle at the point of interest and a voltage phase angle at the distribution bus downstream from the point of interest;

determine a second voltage phase angle deviation between the voltage phase angle at the point of interest and a voltage phase angle at the distribution bus adjacent to the distribution bus downstream from the point of interest; and determine the real power flows and the reactive power flows based on the first voltage magnitude deviation, the second voltage magnitude deviation, the first voltage phase angle deviation, and the second voltage phase angle deviation.

20. The apparatus of claim 19, wherein the voltage magnitude at any given distribution bus of the radial distribution grid downstream from the point of interest is defined as 1.0 p.u. plus a deviation between the voltage magnitude at the point of interest and the voltage magnitude at the given distribution bus, and wherein the voltage phase angle at any given distribution bus of the radial distribution grid downstream from the point of interest is defined as 0° plus a deviation between the voltage phase angle at the point of interest and the voltage phase angle at the given distribution bus.

* * * * *